(12) United States Patent
Seed et al.

(10) Patent No.: US 10,374,910 B2
(45) Date of Patent: Aug. 6, 2019

(54) AUTOMATED SERVICE PROFILING AND ORCHESTRATION

(71) Applicant: Convida Wireless, LLC, Wilmington, DE (US)

(72) Inventors: Dale N. Seed, Allentown, PA (US); Guang Lu, Ontario (CA); Lijun Dong, San Diego, CA (US); Catalina M. Mladin, Hatboro, PA (US); William Robert Flynn, IV, Schwenksville, PA (US); Xu Li, Plainsboro, NJ (US); Hongkun Li, Malvern, PA (US)

(73) Assignee: Convida Wireless, LLC, Wilmington, DE (US)

( * ) Notice: Subject to any disclaimer, the term of this patent is extended or adjusted under 35 U.S.C. 154(b) by 236 days.

(21) Appl. No.: 15/317,189

(22) PCT Filed: Jun. 12, 2015

(86) PCT No.: PCT/US2015/035499
§ 371 (c)(1),
(2) Date: Dec. 8, 2016

(87) PCT Pub. No.: WO2015/191965
PCT Pub. Date: Dec. 17, 2015

(65) Prior Publication Data
US 2017/0126512 A1    May 4, 2017

Related U.S. Application Data

(60) Provisional application No. 62/011,770, filed on Jun. 13, 2014.

(51) Int. Cl.
*G06F 15/16* (2006.01)
*H04L 12/24* (2006.01)
(Continued)

(52) U.S. Cl.
CPC ........ *H04L 41/5045* (2013.01); *G06F 9/5072* (2013.01); *H04L 67/30* (2013.01)

(58) Field of Classification Search
CPC .... H04L 41/5045; H04L 67/30; G06F 9/5072
See application file for complete search history.

(56) References Cited

U.S. PATENT DOCUMENTS 8,458,763 B2 *  6/2013  Gottimukkala ......... H04L 63/20
                                                     713/151
8,484,366 B2    7/2013  Patel et al.
(Continued)

FOREIGN PATENT DOCUMENTS

EP      2 423 813 A2    2/2012
WO    2013/122815 A1    8/2013

OTHER PUBLICATIONS

Cheshire, S. "DNS-Based Service Discovery", Internet Engineering Task Force (IETF), Feb. 2013, 49 pages.
(Continued)

*Primary Examiner* — Moustafa M Meky
(74) *Attorney, Agent, or Firm* — BakerHostetler

(57) ABSTRACT

A system is disclosed for orchestrating services. Service orchestration profiles specify attributes defining desired services. The service orchestration profiles may be distributed amongst nodes and hierarchically related to each other. Service orchestration management functions process the information in the service orchestration profiles in order to determine the desired services and use the information to implement the desired services. The service orchestration management functions may be hierarchically related to each other.

23 Claims, 26 Drawing Sheets

(51) Int. Cl.
*G06F 9/50* (2006.01)
*H04L 29/08* (2006.01)

(56) References Cited

U.S. PATENT DOCUMENTS

| | | | | |
|---|---|---|---|---|
| 8,862,742 B2* | 10/2014 | Livyatan | ............... | H04M 15/00 455/433 |
| 8,943,508 B2* | 1/2015 | Ravishankar | ......... | G06F 9/5038 701/451 |
| 9,276,828 B2* | 3/2016 | Ravi | ....................... | G06Q 30/04 |
| 9,641,403 B2* | 5/2017 | Lehane | ............... | H04L 41/5054 |
| 10,194,414 B2* | 1/2019 | Liu | ....................... | H04W 60/00 |
| 2010/0005504 A1* | 1/2010 | Gottimukkala | ......... | G06F 21/57 726/1 |
| 2011/0029981 A1 | 2/2011 | Jaisinghani | | |
| 2011/0138394 A1* | 6/2011 | Ravishankar | ......... | G06F 9/5038 718/104 |
| 2012/0158970 A1* | 6/2012 | Livyatan | ............... | H04M 15/00 709/226 |
| 2015/0149628 A1* | 5/2015 | Ravi | ....................... | G06Q 30/04 709/224 |

OTHER PUBLICATIONS

European Telecommunications Standard Institute, (ETSI) TS 102 690 V1.1.1, "Machine-to-Machine Communications (M2M); Functional Architecture" Oct. 2011, 146 pages.
International Patent Application No. PCT/US2015/035499: International Preliminary Report on Patentability dated Dec. 22, 2016, 8 pages.
Open Mobile Alliance (OMA) "Lightweight Machine to Machine Technical Specification", Draft Version 1.0, 0-20130206-D, Feb. 6, 2013, 53 pages.
OneM2M TS-0001 V0.2.0 "Functional Architecture", Oct. 2013, 134 pages.
3rd Generation Partnership Project; (3GPP), TS 23.228 V12.4.0, 3rd Generation Partnership Project; Technical Specification Group Services and System Aspects; IP Multimedia Subsystem (IMS); Stage 2 (Release 12), Mar. 2014, 307 pages.
Web Service Definition Language (WSDL), 1.1, W3C Note, Mar. 15, 2001, 30 pages.
Wikipedia, Orchestration (computing), pp. 1-3, Jun. 26, 2017 https://en.wikipedia.org/wiki/Orchestration_computing).

* cited by examiner

AUTOMATED SERVICE PROFILING AND ORCHESTRATION

CROSS-REFERENCE TO RELATED APPLICATIONS

This application is the National Stage of International Application No. PCT/US2015/035499 filed Jun. 12, 2015, which claims benefit under 35 U.S.C. § 119(e) of Provisional U.S. Patent Application No. 62/011,770, filed on Jun. 13, 2014, the contents of which are hereby incorporated herein by reference in its entirety.

BACKGROUND

A service refers to a defined set of functionality or capabilities that is made available and accessible in a network environment. Devices and/or software applications transmit requests to the service which performs the desired function for the particular device or application.

Services are employed in a wide variety of technical environments. For example, services are used extensively in Web related technologies. A Web service with a particular function may be made available at a particular network address. Systems that require the particular functionality may transmit a request via the Web to the web service, which then performs the desired function. In an example scenario, a Web service may be employed by one system to exchange data with an otherwise incompatible system.

Services are also widely used in the context of machine to machine (M2M) and internet of things (IoT) technologies. Machine to machine (M2M) is a broad label that is used to describe technology that enables networked devices to exchange information and perform actions without the manual assistance of humans. The Internet of Things (IoT) refers to a scenario in which objects, including machines and components of machines, are provided with unique identifiers and the ability to automatically transfer data between objects over a network without requiring human-to-human or human-to-computer interaction. Services are used to provide access to M2M capabilities including those related to, for example, security, charging, and data management.

Services may be thought of as existing in a "service layer" of a network architecture. The service layer is positioned on top of the network layer, which enables the services in the services layer to make use of the capabilities of the network layer. The services layer is positioned below a client application layer. Client applications make requests to the services in the services layer in order to access the functionality made available by the services. Accordingly, the service layer is a software middleware layer that supports value-added service capabilities through a set of application programming interfaces and underlying networking interfaces.

Several organizations have attempted to define standards for service operations. For example, with respect to M2M communications and services, oneM2M, the Open Mobile Alliance (OMA), and OMA Lightweight M2M (LWM2M), have sought to standardize aspects of service implementations. These existing M2M/IoT service layer standards (e.g., oneM2M, OMA, LWM2M) define a set of service capabilities that can be supported by individual service layers hosted by service nodes in a network (e.g., servers, gateways, devices).

While the use of services has been widely adopted, managing services is largely a manual activity. Creating and modifying the services often requires human intervention to provision individual machines with the appropriate data and software in order to provide the desired services.

SUMMARY

Applicants disclose herein systems and methods for automated orchestration of services. The disclosed systems and methods automatically configure and coordinate service nodes and service layers so as to provide the desired services. Orchestration may involve automatically configuring and coordinating any and/or all of the following: nodes in a network; service layers hosted on a service node; service capabilities within a service layer; and/or features of a service capability.

In an example embodiment, information defining services are stored in computing memory and referred to as a service orchestration profile. The orchestration profile comprises metadata that is used to coordinate the orchestration of services. In an example embodiment, service orchestration profiles store attributes that define service configurations at each of several different levels of the service architecture including at the network level, service node level, services level, and service capability level. In an example embodiment, a network service orchestration profile may store information that describes the services offered by a network of service nodes. In another example embodiment, a service node orchestration profile may describe the services offered by a single service node which hosts one or more service layers. In yet another example, a service layer orchestration profile may describe the services offered by a single service layer. In still another example, a service capability orchestration profile describes the features offered by a single service capability within a service layer. The profile information may be stored in any suitable format and use any suitable technology including, for example, XML, WSDL, and/or JSON.

According to an aspect of the disclosed embodiments, the orchestration profiles may be hierarchically related to each other with the network service orchestration profile being highest in the hierarchy, and the service capability orchestration profile being the lowest level in the hierarchy. The profiles in the hierarchy may be linked to one or more parent profiles above it in the hierarchy. Likewise, with the exception of the service capability orchestration profile which resides at the bottom, each profile may have profiles linked to it lower in the hierarchy.

In an example embodiment, one or more orchestration management functions are employed to perform the orchestration of services using information about the desired services as stored in the orchestration profiles. Orchestration management functions are software applications that execute on computing hardware and operate to configure service capabilities, levels, and networks. In one example embodiment, a single orchestration management function may be responsible for performing the configuration of services as defined in multiple configuration files. In another embodiment, multiple orchestration management functions may be distributed within a network with each performing the configuration specified in a particular orchestration profile.

In an example scenario, each of several nodes in a network of service level nodes may have stored in computing memory an orchestration management profile and have executing thereon an orchestration management function. The orchestration management functions cooperate to perform orchestration of services consistent with the information in the orchestration management profile. In an example scenario, a first service orchestration management function or application executing on a first computing system or node detects that orchestration of a service is to be performed. In an example scenario, the first computing system may detect that orchestration is needed as a result of receiving a request to perform orchestration. The request may comprise a first service orchestration profile that specifies the configuration that is requested. In an alternative embodiment, the orchestration management function may detect that orchestration is needed as a result of a change in circumstances at the node. The particular circumstance may be defined in an orchestration profile that has been stored on the particular node.

In response to detecting that service orchestration should take place, the first service orchestration management application executing on the first computing system processes a first orchestration profile to identify information regarding the configuration that should take place. As noted above, the first configuration profile may have been received with a request. Alternatively, the first configuration profile may have previously been stored on the first node. In an example embodiment, the first service orchestration management application parses information in the first service orchestration profile to identify information regarding the configuration. The information may include, for example, information specifying a description of the contents of the profile information, target machines or layers to which the orchestration information applies, scheduling information, policy information, context information, information relating to desired services, and any other information related to the orchestration of services.

The first service orchestration management application executing on the first computing system identifies, using the first orchestration profile, a desired service configuration for orchestration. For example, the first service orchestration management application may determine that the orchestration profile specifies a desired mix and distribution of service node configurations in the network. By way of further example, the application may determine that the orchestration profile specifies a desired configuration of a service node, the desired configuration of a service layer, or the desired configuration of a service capability.

The first service orchestration management function takes the appropriate action on the computing system to implement the desired service configuration. For example, the first service orchestration management application may modify the number of service layer instances on the first computing system. In another example scenario, the first service orchestration management application may modify the capabilities associated with a particular service layer. In still another example, the first service orchestration management application may modify features associated with a particular service capability.

In some instances, the first service orchestration management function may determine that the requested orchestration requires orchestration by another orchestration management function. As described above, there may be a plurality of orchestration profiles used in a service layer network with each profile specifying some aspect of the configuration of the provided services. Further, the service profiles may be related such that a higher level profile relies upon the orchestrations provided by a lower level profile. Accordingly, during processing of an orchestration profile, the first service orchestration management function may determine that the orchestration requires orchestration by a second orchestration management function. In an example scenario, the first orchestration management function may find reference to a second orchestration profile in the first orchestration profile that provides an indication that a second orchestration management function is required to implement the required orchestration.

In an example embodiment, the first service orchestration management application transmits a request to the second service orchestration management application. The second service orchestration management application may be located on the same physical node or machine, or may be located on a physically separate node or machine.

Upon receiving the request, the second service orchestration management application refers to the second service orchestration profile to determine the desired services. The second service management application configures the service related features consistent with the second service orchestration profile. For example, the second service management application may modify the set of features associated with a service capability. In another example, the second service management application may modify the capabilities associated with a particular service layer.

Upon completing the configuration of service related features consistent with the information in the second service profile, the second service orchestration management function generates and transmits a status or response to the first service orchestration management function. The response includes any relevant information including, for example, whether the requested orchestration has completed successfully.

Upon receipt of the response from the second service orchestration management function, and after completing any other service configurations, the first service orchestration management function generates and transmits a response to the extent the orchestration was made in response to a request from another machine or orchestration management function.

Automated service orchestration as disclosed herein may be used to support value-add features such as allowing applications in the network to configure/customize service layers, and allowing service layer instances to collaborate with one another to coordinate the set of service capabilities hosted on each service layer instance. In doing so, service orchestration can be used to create a virtual service layer that can be configured in order to, for example, meet the needs of an individual application.

The disclosed systems and methods may be used in connection with any network services including for example, Web based services and machine to machine services. Moreover, the disclosed systems and methods may be implemented using any relevant standards including, for example, OneM2M, OMA, and LWM2M.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Applicants disclose herein example embodiments of systems and methods for automated service orchestration. Service orchestration profiles specify attributes defining the desired services. The service orchestration profiles may be distributed amongst nodes and hierarchically related to each other. Service orchestration management functions process the information in the service orchestration profiles in order to implement the desired services.

Example Service Architecture

Figure 1:
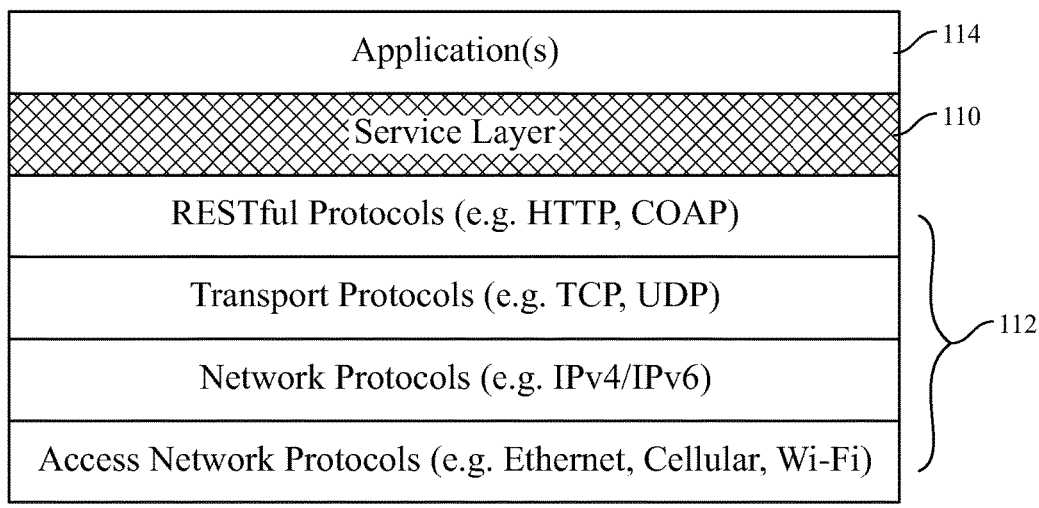
FIG. 1 depicts an example protocol stack depicting relative positioning of a service layer.

From a network and architectural perspective, services may be thought of as existing in a "service layer." FIG. 1 provides a diagram of an example protocol stack illustrating the relative location of a service layer. As shown, the service layer 110 sits on top of various transport and network layers 112. This allows the services in the services layer to make use of the capabilities in the network layer in providing the services. The services layer may be thought of as existing below a client application layer 114. Client applications make requests to the services in the services layer in order to access the functionality made available by the services. Accordingly, the service layer operates as middleware that provides access to the functions and capabilities exposed by the services.

Figure 2:
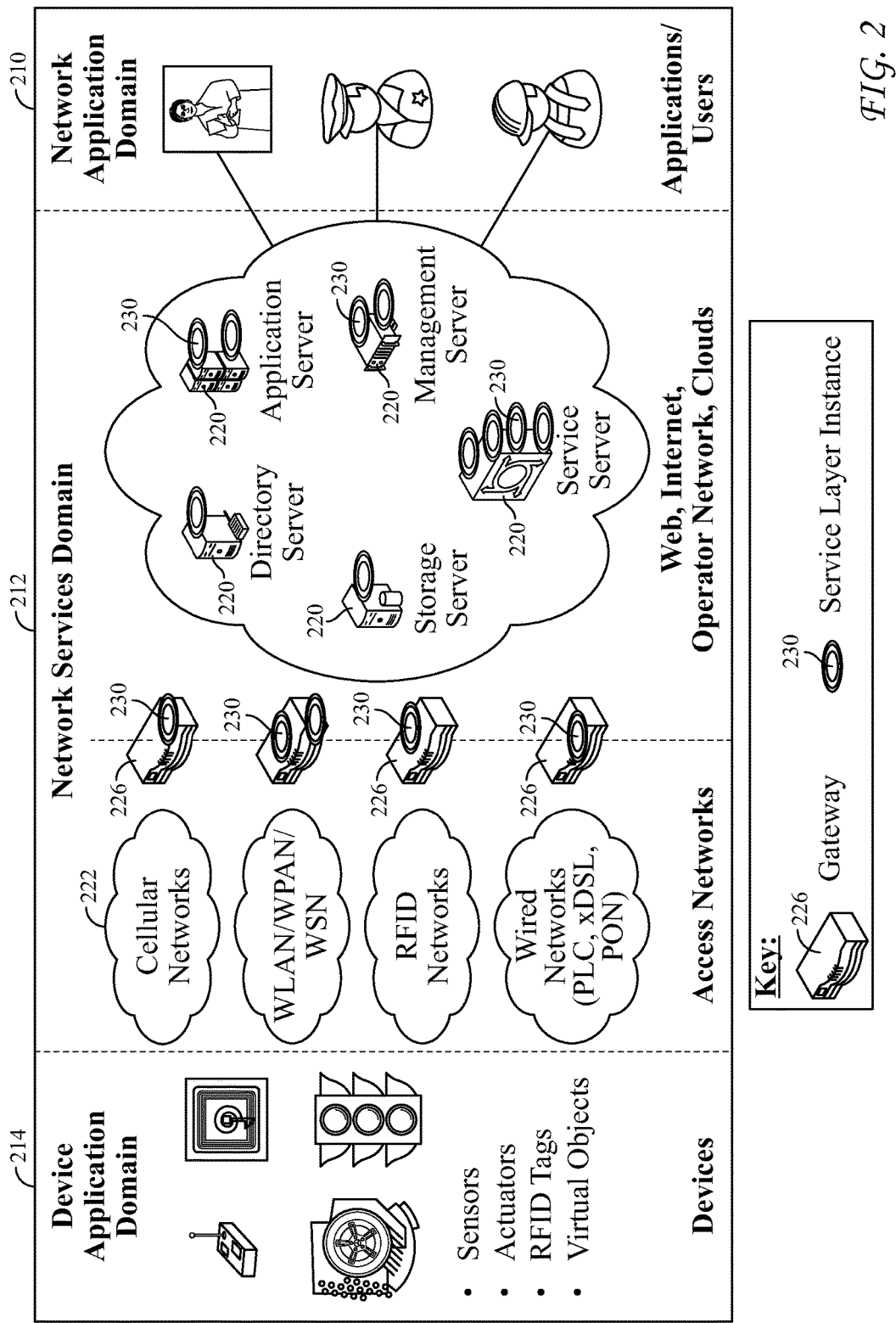
FIG. 2 depicts an example service layer deployment in a network.

FIG. 2 illustrates an example network topology having instances of service layers deployed therein. Referring to FIG. 2, user applications existing in network application domain 210 may require that particular functions be performed. The user applications may execute on a device 30 such as that described below in connection with FIG. 23A. By way of example, a user application devoted to managing devices in a network may require information about the current status of devices. In another example, a user application may be a Web application and may need to communicate data to another application that uses another data formatting standard.

The applications communicate requests for particular services to network services domain 212. As shown, network services domain 212 comprises various network nodes 220. Network nodes 220 are network addressable entities within a network. A network node 220 may be a physical item such as, for example, a device, gateway, or server, or may be a virtual entity such as, for example, a virtual machine created using virtualization software such as, for example, VMware. In the example embodiment of FIG. 2, network nodes 220 comprise various server types including, for example, directory server, application server, storage server, management server, and service server. Network nodes 220 may be implemented by any suitable computing system such as, for example, that described below in connection with FIG. 23B. In the embodiment of FIG. 2, access to various networks 222 is provided via gateways 226. Gateways may be implemented by any suitable computing system such as, for example, that described below in connection with FIG. 23A Servers 220 and gateways 226 have service layers 230 thereon. Service layers 230 are software middleware layers that support value-added service capabilities through a set of application programming interfaces (APIs) and underlying network interfaces. Requests from applications in network application domain 210 to perform a particular service function are routed to and received at particular service layers 230. The service layers 230 process the requests and return the results of the requested service to the requesting application. Network nodes that host a service layer supporting one or more service capabilities are referred to as a service node.

Referring to FIG. 2, the services in services layers 230 may also be requested by device applications such as those that exist in device application domain 214. Accordingly, where a particular device such as, for example, a sensor or actuator, requires that a particular functionality be performed, the devices may transmit a request to the appropriate service existing in one of the services layers in network services domain 212. The service layers 230 process the requests and return the results of the requested service to the requesting device. The devices in device application domain 214 may be implemented using any suitable computing system such as, for example, those described in connection with FIG. 23A below.

In some instances, a service within the network services domain may require functionality provided by one of the other services. Accordingly, a service in a service layer 230 may transmit a request to a service existing in another service layer 230. When the service that received the request completes its processing, it transmits a response to the requesting service.

Service layers 230 may be any type of service layer. For example, one or more of service layers 230 may be an IP Multimedia Subsystem (IMS) service layer specifically targeted to providing multimedia services for mobile network devices. By way of further example, one or more of service layers 230 may be an M2M/IoT service layer. The M2M/IoT service layer is an example of one type of service layer specifically targeted towards providing value-added services for M2M/IoT type devices and applications. Recently, several industry standards bodies (e.g., ETSI M2M, oneM2M, and OMA LWM2M) have been developing M2M/IoT service layers to address the challenges associated with integration of M2M/IoT types of devices and applications into deployments such as the Internet/Web, cellular, enterprise, and home network.

An M2M service layer can provide applications and devices access to a collection of M2M centric capabilities supported by the service layer. A few examples include security, charging, data management, device management, discovery, provisioning, and connectivity management. These capabilities are made available to applications via APIs which make use of message formats, resource structures, and resource representations defined by the M2M service layer.

The purpose and goal of oneM2M is to develop technical specifications which address the need for a common M2M service layer that can be readily embedded within various hardware and software, and relied upon to connect a wide variety of devices in the field with M2M application servers worldwide.

Figure 3:
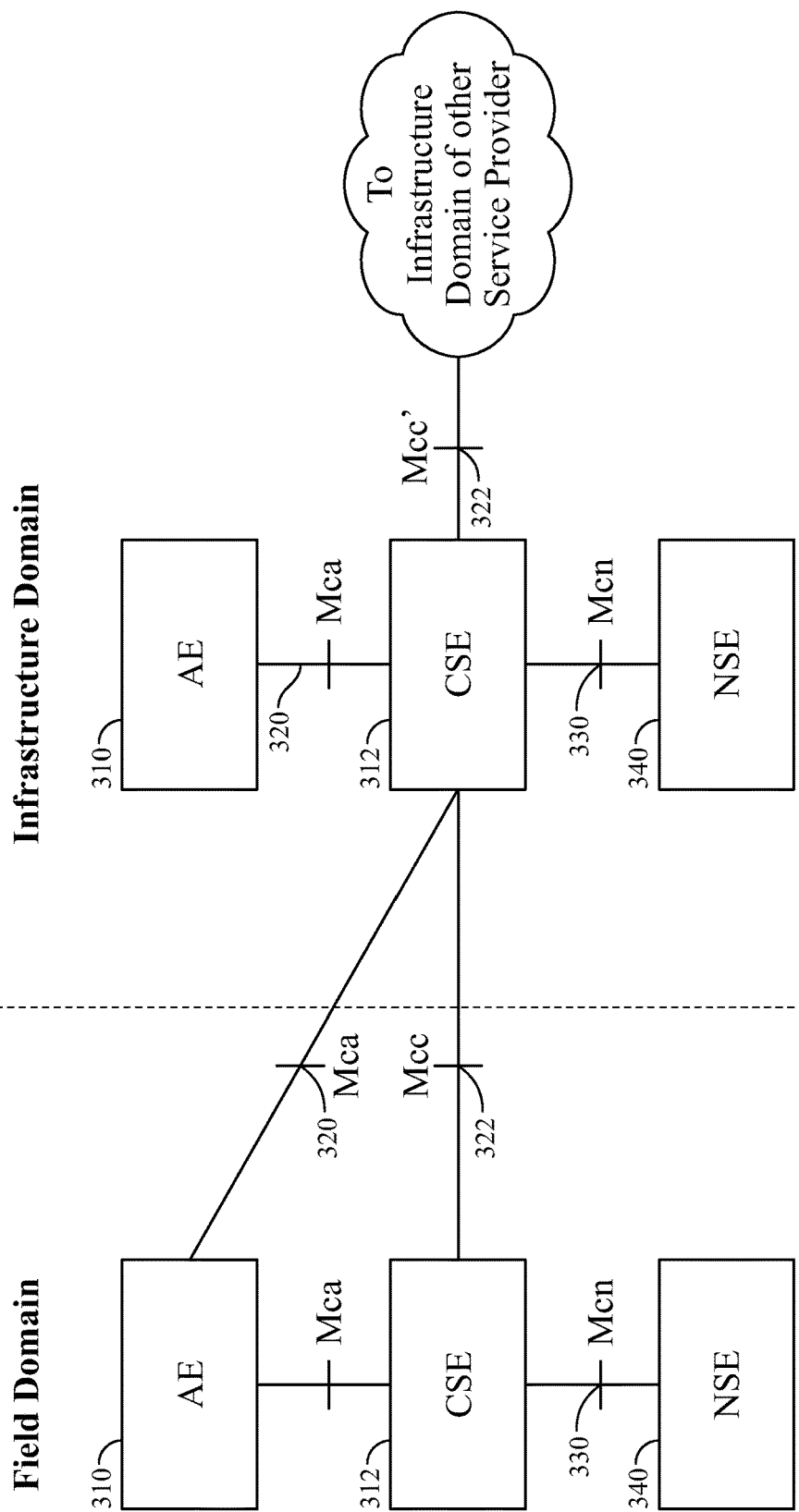
FIG. 3 is a diagram depicting an example oneM2M architecture.

FIG. 3, illustrates example basic oneM2M architecture. As shown, the oneM2M architecture comprises application entities (AEs) 310 which provide application logic in oneM2M solutions. The oneM2M common services layer supports a set of Common Service Functions (CSFs) (i.e., service capabilities). An instantiation of a set of one or more particular types of CSFs is referred to as a Common Services Entity (CSE) 312 which can be hosted on different types of network nodes (e.g., infrastructure node, middle node, application-specific node). Service functions are exposed to other entities through reference points Mca 320 and Mcc 322. Reference point Mcn 330 is used for accessing underlying network service entities. Network services entities (NSEs) 340 provide services to the CSEs. Examples of M2M services include device management, location services, and device triggering. The underlying NSE 340 may be, for example, a 3GPP based network.

oneM2M applications are typically implemented using the representational state transfer (RESTful) architecture. In such instances, the CSFs are represented as a set of RESTful "resources." A resource is a uniquely addressable entity in the architecture having a representation that can be manipulated via RESTful methods such as Create, Retrieve, Update, and Delete. These resources are made addressable using Universal Resource Identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information about the resource.

Service Descriptions

In order for an application or another service to be able to invoke a particular service, the application or other service needs to have information about the particular service. One commonly used mechanism for providing such information is a service description. A service description provides a means for services to publish information about themselves and for perspective clients to discover this information. Service profiles typically provide a consolidated, machine-readable set of information such as URIs, media types, supported protocols, supported services, etc. One example of an existing service description technology is the Web Services Description Language (WSDL).

WSDL is an XML-based Web services description language that is used for describing the interface of a Web service. A WSDL file provides a machine-readable description of how a Web service can be called, what parameters it expects, and what data structures it returns. The following is an example WSDL template:

```
<wsdl:description xmlns:wsdl="http://www.w3.org/ns/wsdl">
    <wsdl:types>
    <wsdl:interface>
    <wsdl:binding>
    <wsdl:service>
</wsdl:description>
```

In the example template, the root element is the 'description' element. Four child elements, i.e., 'types', 'interface', 'binding', and 'service,' provide details regarding the particular service.

The 'types' element contains all of the XML schema elements and type definitions that describe the Web service's messages. The XML Schema language (also known as XSD) may be used (inline or referenced) for this purpose.

The 'interface' element defines the Web service operations, including the specific input, output, and fault messages that are passed to and from the service, and the order in which the messages are passed.

The 'binding' element defines the manner in which a client can communicate with the Web service. In the case of REST Web services, a binding specifies that clients can communicate using HTTP. In the case of SOAP, a binding specifies that clients can communicate with the service using the SOAP RPC binding style and protocol.

The 'service' element associates an address for the Web service with a specific interface and binding. The 'service' also contains a set of system functions that have been exposed to the Web-based protocols.

An example WSDL listing is as follows:

```
<?xml version="1.0" encoding="UTF-8"?>
<description xmlns="http://www.w3.org/ns/wsdl"
    xmlns:tns="http://www.tmsws.com/wsdl20sample"
    xmlns:whttp="http://schemas.xmlsoap.org/wsdl/http/"
    xmlns:wsoap="http://schemas.xmlsoap.org/wsdl/soap/"
    targetNamespace="http://www.tmsws.com/wsdl20sample">
<!-- Abstract type -->
    <types>
        <xs:schema xmlns:xs="http://www.w3.org/2001/XMLSchema"
            xmlns="http://www.tmsws.com/wsdl20sample"
            targetNamespace="http://www.example.com/
            wsdl20sample">
            <xs:element name="request"> ... </xs:element>
            <xs:element name="response"> ... </xs:element>
        </xs:schema>
    </types>
<!-- Abstract interfaces -->
    <interface name="Interface1">
        <fault name="Error1" element="tns:response"/>
        <operation name="Opp1" pattern="http://www.w3.org/ns/wsdl/
        in-out">
            <input messageLabel="In" element="tns:request"/>
            <output messageLabel="Out" element="tns:response"/>
```

-continued

```
        </operation>
    </interface>
    <!-- Concrete Binding Over HTTP -->
    <binding name="HttpBinding" interface="tns:Interface1"
        type="http://www.w3.org/ns/wsdl/http">
        <operation ref="tns:Get" whttp:method="GET"/>
    </binding>
    <!-- Concrete Binding with SOAP-->
    <binding name="SoapBinding" interface="tns:Interface1"
        type="http://www.w3.org/ns/wsdl/soap"
        wsoap:protocol="http://www.w3.org/2003/05/soap/bindings/
        HTTP/"
        wsoap:mepDefault="http://www.w3.org/2003/05/soap/mep/
        request-response">
        <operation ref="tns:Get" />
    </binding>
    <!-- Web Service offering endpoints for both bindings-->
    <service name="Service1" interface="tns:Interface1">
        <endpoint name="HttpEndpoint"
            binding="tns:HttpBinding"
            address="http://www.example.com/rest/"/>
        <endpoint name="SoapEndpoint"
            binding="tns:SoapBinding"
            address="http://www.example.com/soap/"/>
    </service>
</description>
```

It will be appreciated that while WSDL is a useful technology for providing service descriptions, many other technologies might alternatively be used. For example, an alternative service description technology is the Domain Name System—Service Discovery (DNS-SD).

Service Profiling

Applicants have noted that existing service description technologies such as, for example, WSDL and DNS-SD, support publishing and discovery of services, but do not support orchestration of services.

Applicants have also noted that existing service layer technologies (e.g., ETSI M2M, oneM2M, and OMA LWM2M) do not support orchestration of service capabilities. For example, existing service layer technologies do not support orchestrating services across a network of service nodes. Existing M2M/IoT service layers will not dynamically coordinate, in a network wide fashion, active service layer instances hosted by network service nodes (e.g., devices, gateways, and servers) as well as the service capabilities supported by each service layer instance.

Figure 4:
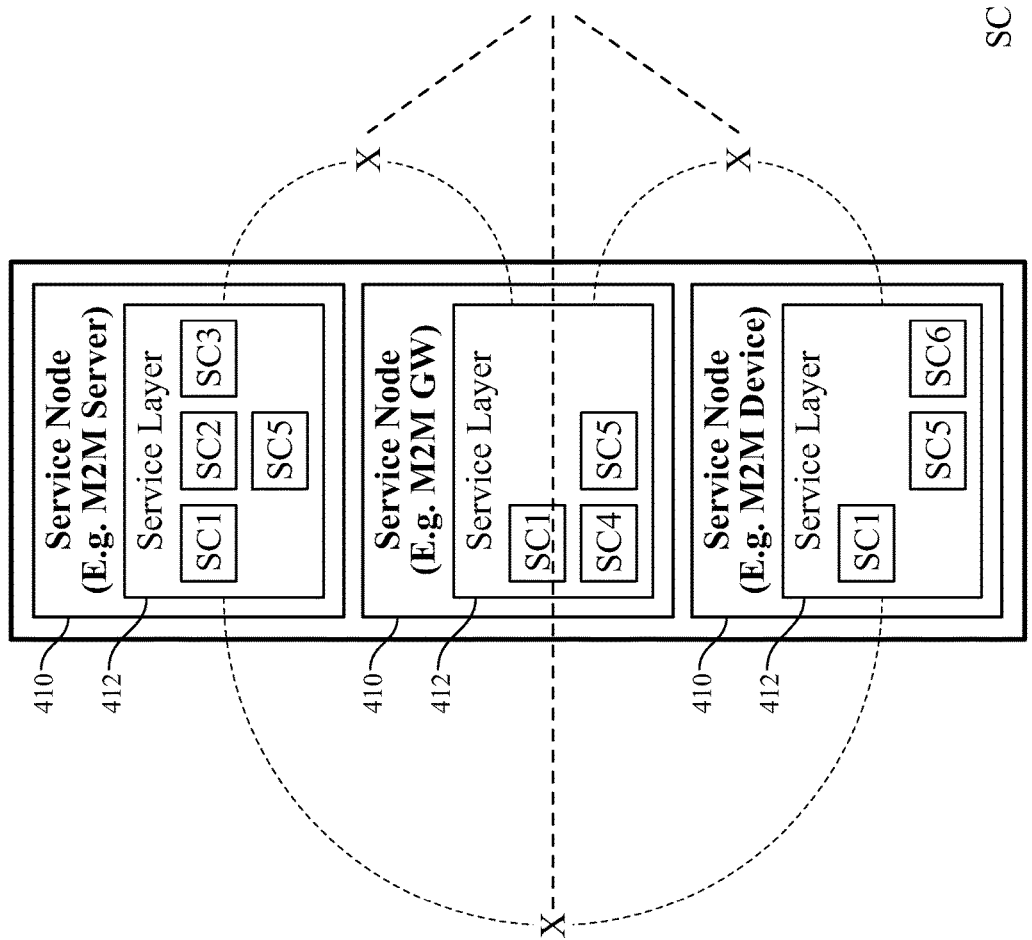
FIG. 4 is a diagram depicting an example service architecture.

FIG. 4 illustrates an example service architecture wherein the system lacks the ability to orchestrate services across a network of service nodes. As shown, the individual service nodes 410 host service layers 412 having different combinations of services (SC1, SC2, SC3, SC4, SC5, SC6) with respect to one another. In a typical scenario, the service nodes 410 may have different physical resources (e.g., memory, MIPs, network bandwidth, etc.), and at different times they may have varying amounts of available resources. It may be desirable, therefore, to dynamically change the services that the nodes support. However, in existing systems, the service nodes 410 lack the capability to dynamically coordinate their services with one another (e.g., which nodes are to support which services and under what conditions) and hence these dynamic changes cannot be performed in a coordinated manner. Under some circumstances, service nodes 410 may need to have a consistent configuration of services across each service node in the network in order to provide end-to-end services. While in other circumstances, it may be desirable to have a different but complimentary set of services hosted on each service node 410. In either case, coordination between the service nodes 410 to allow services to be properly orchestrated in the desired manner can be value-add.

Existing service layer technologies also do not support orchestrating services between service layers 412. More particularly, existing service layer technologies such as, for example, M2M/IoT, do not allow service layers 412 to coordinate with one another and to determine which service layers 412 are to provide which service capabilities. For example, existing service layers 412 do not provide a mechanism to coordinate the set of service capabilities offered by each service layer 412 such that the overall mix of services is balanced across the service layers 412 and well distributed.

Existing service layer technologies also do not support self-orchestration of service capabilities. For example, existing M2M service layer nodes lack support for autonomous and dynamic modification of their supported service layers. Similarly, existing service layers do not support self-orchestration of its set of service capabilities. Furthermore, in existing systems, a service capability, which is typically a specific type of service supported by a service layer, lacks support for self-orchestration of its set of supported features. Existing service layer technologies do not support filtering its set of service capabilities so as to offer a subset to particular clients, or offer certain service capabilities only during certain times or during certain observed conditions (e.g., based on criteria such as network conditions, client specified context, etc.), or configuring its service capabilities to operate in different modes for particular clients.

Existing service layer technologies also do not support providing application-specific service orchestration. For example, existing M2M/IoT service layers 412 lack support for allowing applications to selectively pick and choose a desired set of service capabilities that the service layer is to provide to the application (from an overall set of service capabilities supported by the service layer node). In addition, existing service layer technologies lack support to allow applications to provide input to the service layer to allow it to customize the set of service capabilities to meet the individualized needs of the application.

Figure 5:
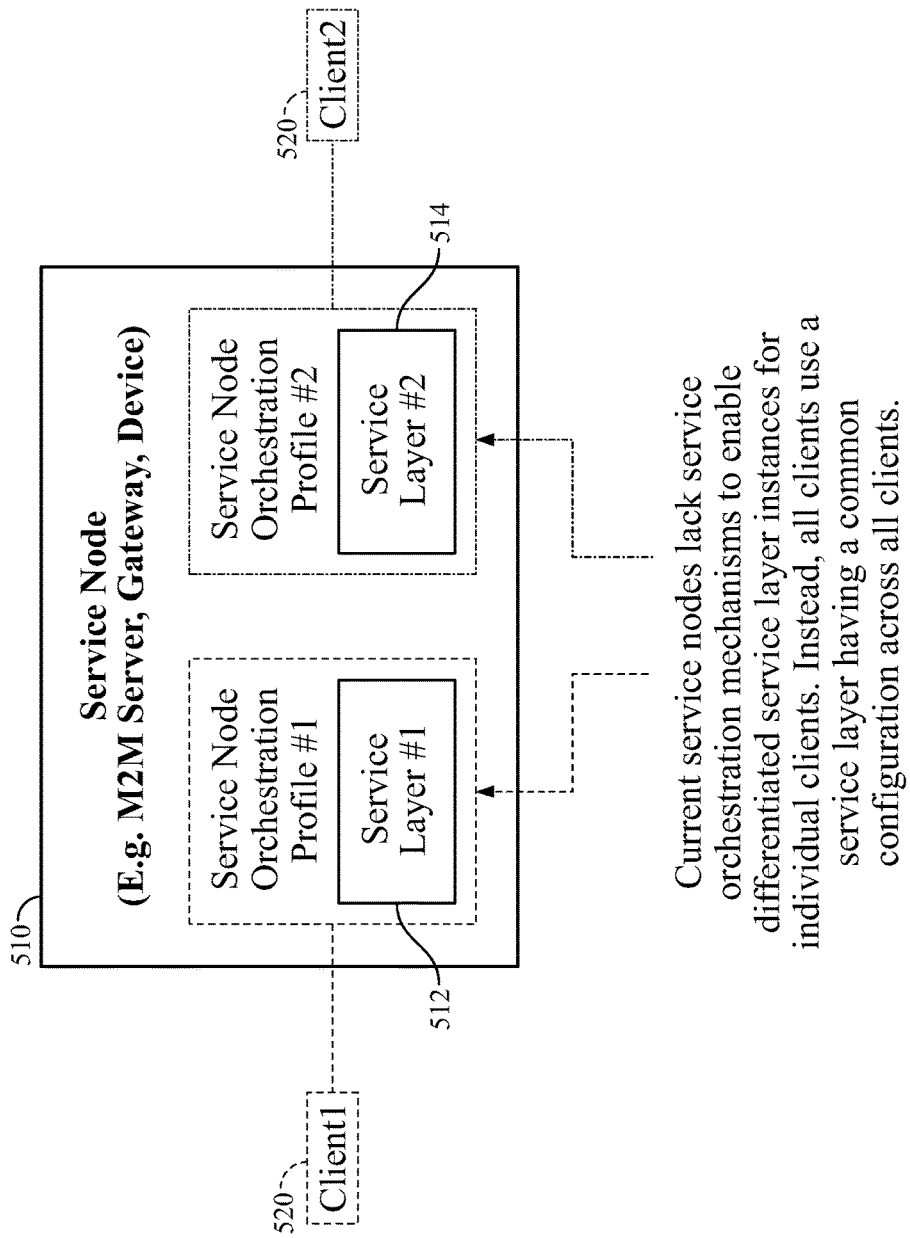
FIG. 5 is a diagram depicting an example service architecture.

FIG. 5 illustrates the example situation wherein a service node lacks the capability for dynamic orchestration of its service layer(s) for its individual clients. In the depicted example, the service node 510 lacks the capability to be dynamically orchestrated (e.g., by its clients 520) so as to provide different types/configurations of service layers 512, 514 to its individual clients 520. Instead, in the example of FIG. 5, clients are restricted to a static service layer configuration.

Figure 6:
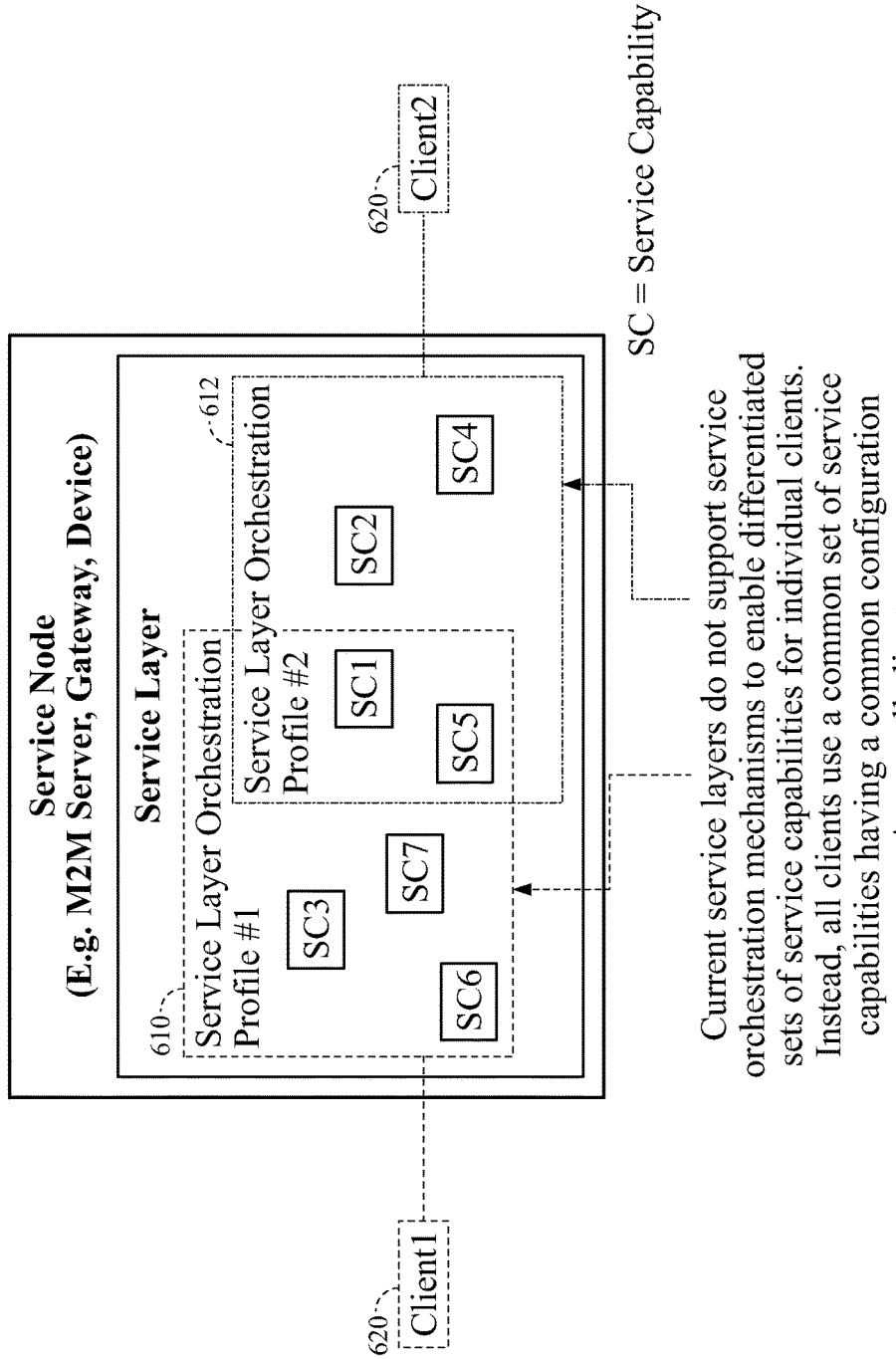
FIG. 6 is a diagram depicting an example service architecture.

FIG. 6 illustrates another example scenario wherein a service layer lacks the capability for dynamic orchestration of its service capabilities for its individual clients 620. In the depicted example, the service layer lacks the capability to enable differentiated sets 610, 612 of service capabilities for individual clients. Instead, all clients are restricted to a common set of services having a common configuration across all clients.

Figure 7:
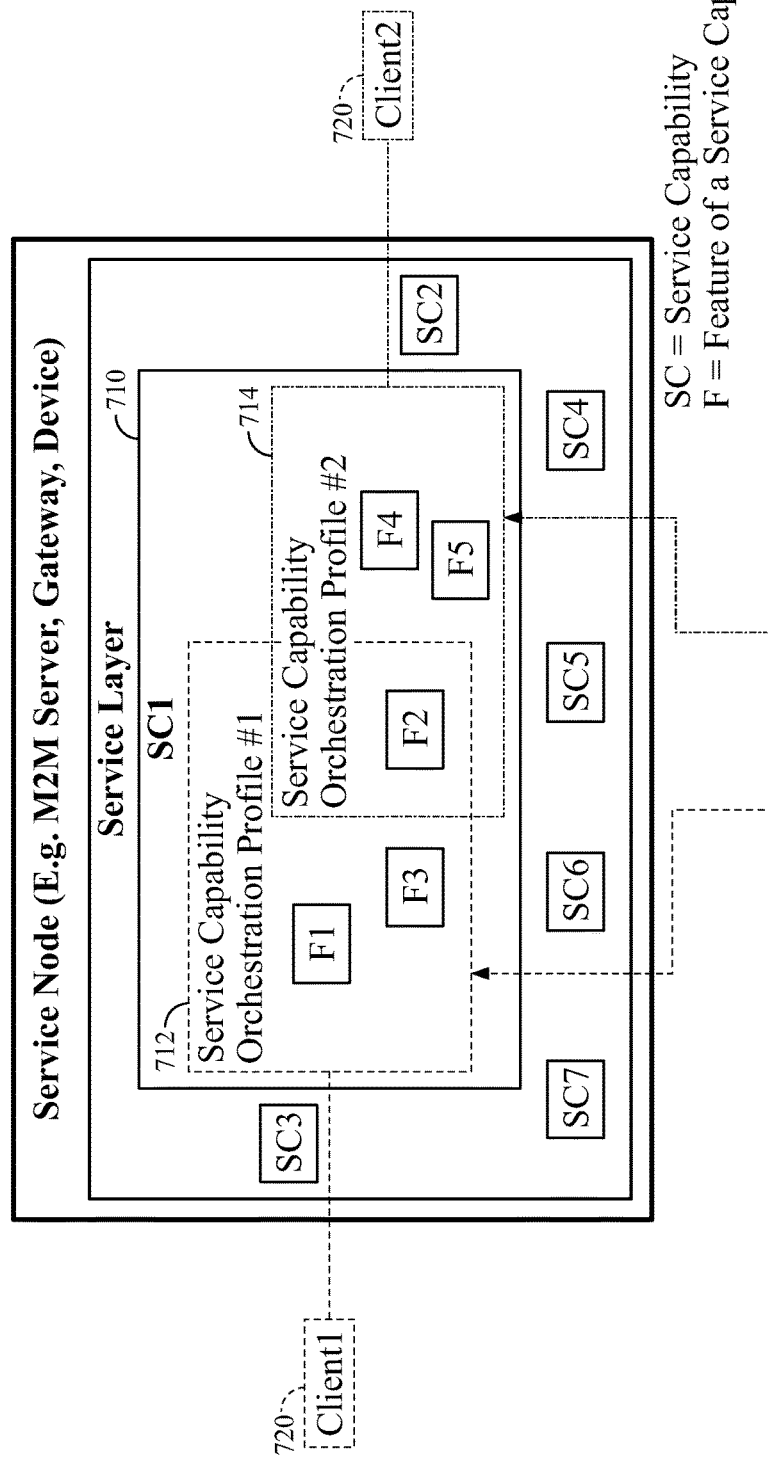
FIG. 7 is a diagram depicting an example service architecture.

FIG. 7 depicts yet another example scenario illustrating the lack of capability for dynamic orchestration of features supported by one of its individual service capabilities. In the depicted example, the service layer lacks the ability to be dynamically orchestrated in order to provide different groups 712, 714 of features (F1, F2, F3, F4, and F5) of an individual service capability 710 (i.e., SC1) to its individual clients 720. Instead, all clients are provided with a common set of features for the service. In an example embodiment, features may include different modes of operation that a service capability may support such as caching enabled or disabled, store-and-forward enabled or disabled, encryption enabled or disabled, etc.

Accordingly, current network deployments of service nodes typically lack the capability for dynamic orchestration of their supported service layers and corresponding service capabilities. As a result, service nodes are typically limited to supporting a single static configuration for the service layers they host and the service capabilities which they make available to all their clients.

Automated Service Orchestration

Applicants disclose herein, systems and methods for the automated orchestration of services. The disclosed systems and methods configure and coordinate nodes and service layers so as to provide the desired services. For example, orchestration may involve automatically configuring and coordinating any and/or all of the following: nodes in a network; service layers hosted on a service node; service capabilities within a service layer; and/or features of a service capability.

Figure 8:
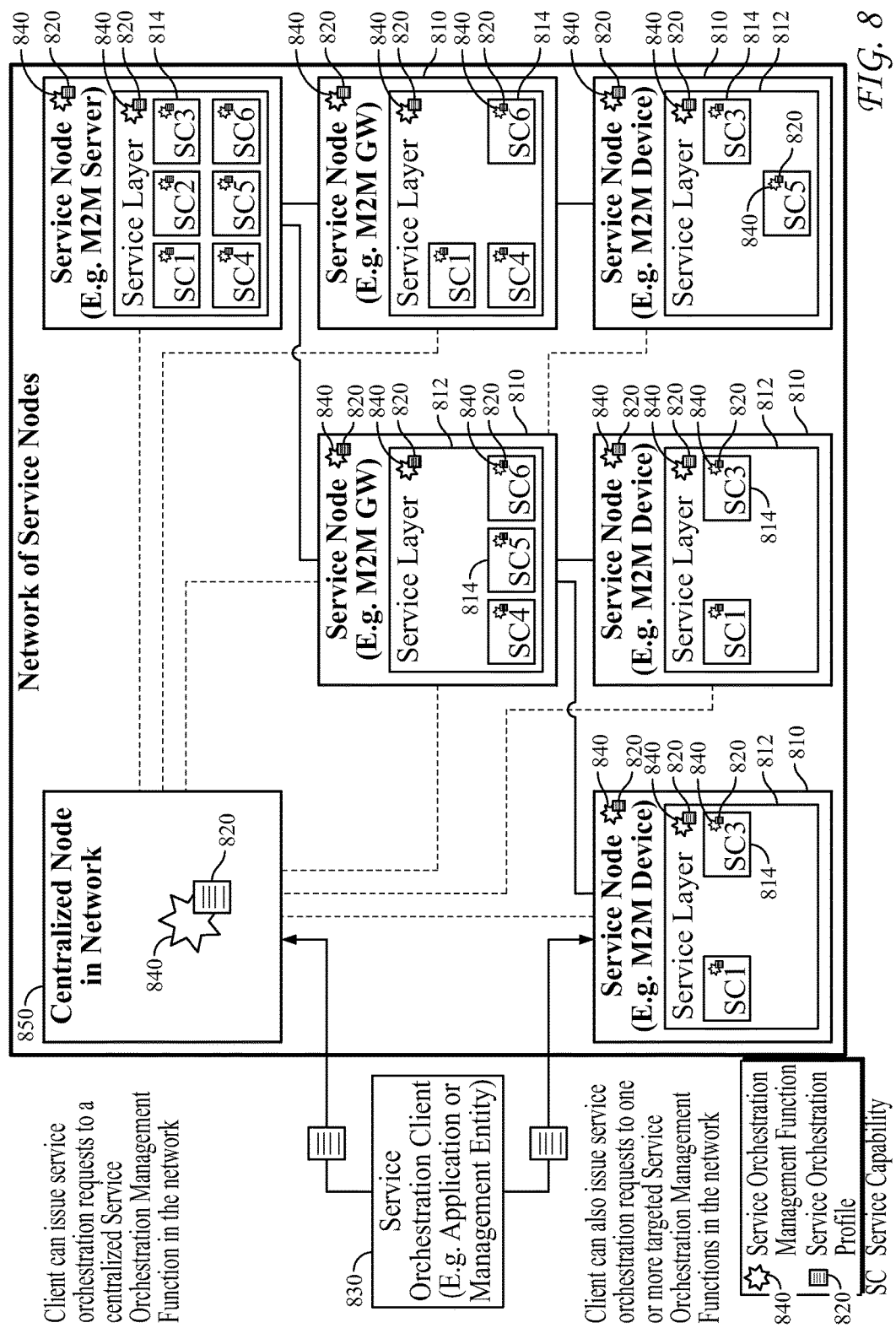
FIG. 8 is a diagram depicting an example service orchestration architecture.

FIG. 8 depicts an example service orchestration architecture. As shown, the example architecture comprises a plurality of nodes 810. The service nodes 810 are network addressable entities within a network and are communicatively coupled with each other using any suitable networking and communication technology. The service nodes 810 may be either a physical device (e.g., device, gateway, or server) or a virtual entity (e.g., VM) in a network. It will be appreciated that service nodes 810 may be implemented using any suitable computing hardware. For example, service nodes 810 that function as servers in the network may be implemented using a computing system such as is described below in connection with FIG. 23B. Service nodes 810 that function as gateways or as terminal devices may be implemented using a computing system such as is described below in connection with FIG. 23A.

Each of the depicted service nodes 810 hosts a service layer 812 supporting one or more service capabilities 814. The service capabilities 814 are specific types of services supported by a service layer. As discussed below, each service capability 814 comprises one or more service functions 840.

Service orchestration profiles 820, which are stored on the service nodes 810, define the attributes of a service. The service orchestration profiles 820 provide a mechanism for the exchange of service related attributes (i.e., metadata) that can be used for service orchestration as well as other functions such as service discovery. As illustrated in FIG. 8, in an example embodiment, the service orchestration profiles 820 may exist at multiple levels within the service hierarchy. For example, profiles 820 may be provisioned in order to define the service functions of particular service capabilities 814. Similarly, profiles 820 may be provisioned for a service layer 812 in order to define the attributes of the particular service layer 812. Likewise, profiles may be provisioned for a service node 810 so as to define the attributes of the services provided by the particular service node 810. In an example scenario, a profile 820 may be provisioned at a centralized node 850 which operates to coordinate service provisioning for various levels in the hierarchy.

Service orchestration management functions 840, which execute on the service nodes 810, are employed to implement the desired services consistent with the attributes stored in the service orchestration profiles 820. The service orchestration management functions 840 process the information in the relevant orchestration profiles 820 and take the appropriate actions in order to implement the services as specified in the profiles 820.

In an example embodiment, and similar to the service profiles 820, the service orchestration management functions 840 may exist at multiple levels within the service hierarchy. For example, service orchestration management functions 840 may execute at and perform orchestration of services within the network, service nodes 810, service layers 812, and service capabilities 814. Separate instances of the service orchestration management function 840 may be distributed across a network and hosted by individual service nodes, service layers, and/or service capabilities. An embodiment employing distributed management functions may provide enhanced scalability for orchestration of services across wide scale networks such as the Web/Internet.

In another example embodiment, service orchestration management function 840 may be provisioned at centralized node 850. A centralized deployment of a management function 840 and service orchestration profile 820 may be well-suited for orchestration of services owned and operated by a particular service provider or services deployed within a certain network domain or region.

A service orchestration client 830, which may be, for example, an application or management entity, communicates with the service orchestration management functions 840 in order to initiate and manage orchestration of services. In an embodiment wherein a service orchestration management function 840 has been located at a centralized node 850, orchestration client 830 communicates with the orchestration management function 840 on the centralized node 850 in order to initiate the orchestration. In an example scenario, the communication may comprise a service profile 820 that includes information describing the service orchestration that is desired. In an embodiment wherein the service orchestration management functions 840 have been distributed to individual nodes 810, service orchestration client 830 may communicate with the service orchestration management functions 840 on the individual nodes in order to initiate and manage the orchestration of services. Here, as well, the communication may comprise a service profile 820 that includes information describing the service orchestration that is desired.

The service profiles 820 and service management functions 840 are hierarchically related to each other. Accordingly, when a request to orchestrate services is received, the service management function 840 may initiate configuration steps at other service management functions 840 in order to implement the desired service orchestration.

While service orchestration may often be initiated as a consequence of a request from client 830, orchestration may be undertake without an explicit request. Service orchestration can be triggered automatically by the service layer (i.e., self-orchestration). For example, a service orchestration management function 840 may trigger orchestration without outside prompting. The trigger may be a request to the service layer for certain services, or it may be based on statistics within the service layer so that it performs self-orchestration.

Although the example embodiment of FIG. 8 depicts service orchestration management functions 840 and service orchestration profiles 820 distributed on all nodes 810, deployment of the service orchestration management function can be done in an optional manner such that it is an optional feature within a network and/or not required to be supported by all service nodes in the network. In instances where a service management function 840 is present, service orchestration can be supported. In scenarios where a service management function 840 is not present, service orchestration may not be supported.

Service Orchestration Profiles

As illustrated in FIG. 8, orchestration profiles 820 may be positioned at any of several different locations within a network of service nodes 810 depending upon the aspect of the service to which the profile relates, e.g., service capability, service layer, service node, etc. The profiles 820 may make reference to each other and thereby may be viewed as presenting a scalable hierarchy. For purposes of organization, the profiles 820 may be classified according to the particular level within the service orchestration to which the profile relates. For example, the profiles 820 may be classified as a network service orchestration profile, service node orchestration profile, service layer orchestration profile, and service capability orchestration profile.

In an example embodiment, a network orchestration profile 820 describes the services offered by a network of service nodes 810, where each service node 810 hosts one or more service layers 812. This profile can be used by the service orchestration management function(s) 840 to coordinate a mix of service capabilities (SC1, SC2, SC3, SC4, SC5) across multiple service layers 842 distributed across a network of service nodes.

A service node orchestration profile 810 describes the services offered by a single service node 810 which hosts one or more service layers 812. This profile 820 can be used by the service orchestration management function(s) to coordinate a mix of service capabilities across one or more service layers 812 hosted on a single service node 810.

A service layer orchestration profile describes the services offered by a single service layer 812. This profile can be used by the service orchestration management function(s) 840 to coordinate a mix of service capabilities supported by a single service layer 812.

A service capability orchestration profile describes the features offered by a single service capability (SC1) within a service layer 812. This profile can be used by the service orchestration management function(s) to coordinate a mix of features supported by the particular service capability.

Figure 9A:
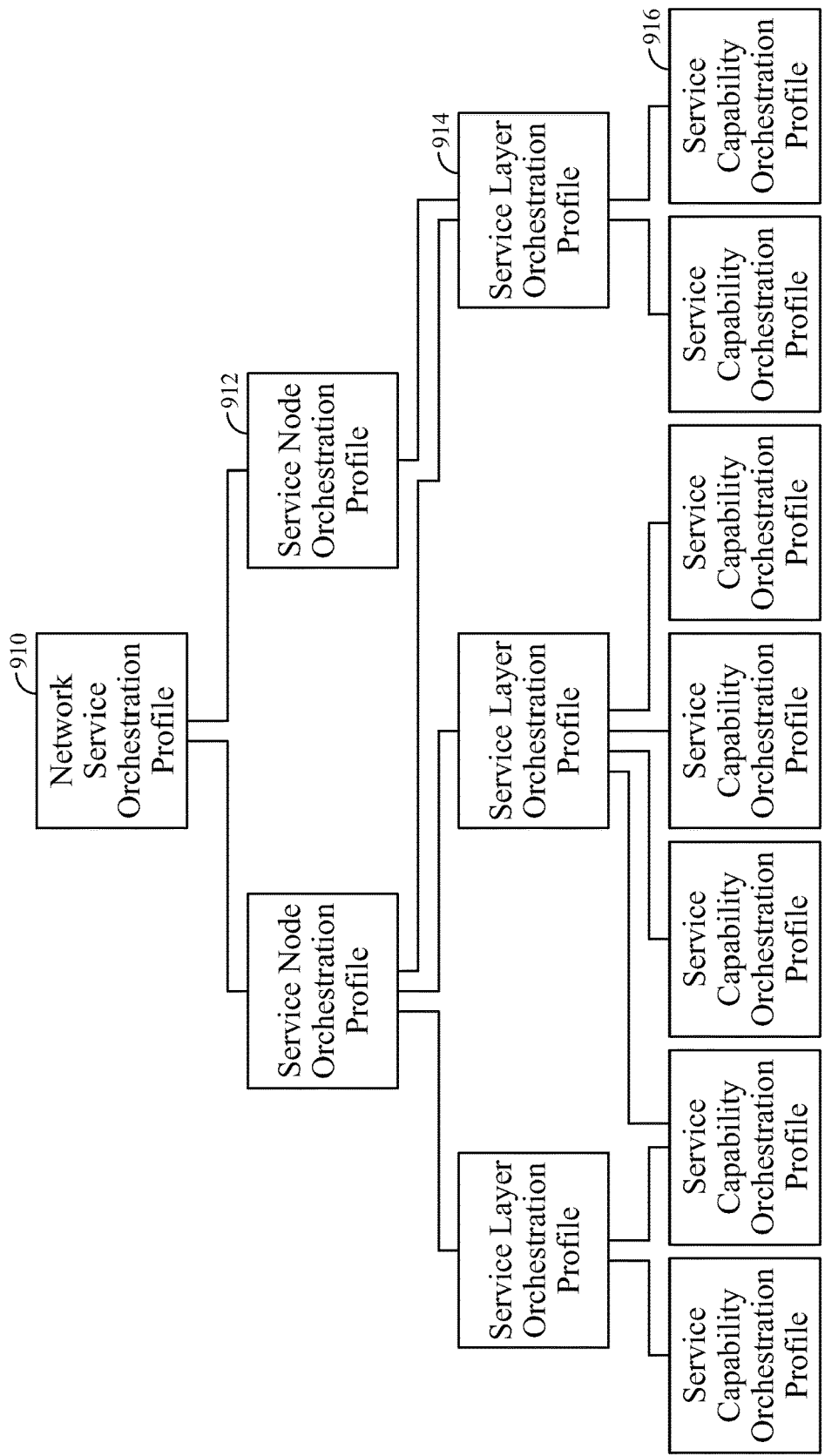
FIG. 9A is a diagram depicting a hierarchical arrangement of service profiles.

FIG. 9A depicts an example set of orchestration profiles that have been arranged hierarchically. As shown, network service orchestration profiles 910 reside at the topmost level, followed by service node orchestration profiles 912, service layer orchestration profiles 914, and service capability orchestration profiles 916 which reside at the bottom. With the exception of a network service orchestration profile 910 which resides at the top, each profile in the hierarchy can be linked to one or more parent profiles above it in the hierarchy. With the exception of the service capability orchestration profile 916 which resides at the bottom, each profile can have child profiles link to it lower in the hierarchy. Depending on the deployment use case scenario, the complete hierarchy of profiles can be used or alternatively only a subset of the hierarchy can be used.

Hierarchically related orchestration profiles are especially well-suited for orchestrating networks of services that consist of distributed service layers supporting multiple service capabilities (such as those defined by ETSI M2M, oneM2M, and OMA LWM2M). The disclosed hierarchically related orchestration profiles are scalable and support profiling distributed sets of services. The hierarchically related profiles may be scaled down to support profiling of features for a single service capability, and may also be scaled up to profile services distributed across a network of service nodes. In an example scenario wherein service capabilities supported by service layers are hosted across a network of service nodes, the entire hierarchy of profiles may be used. In another example scenario wherein the features of a single service capability instance require orchestration, an individual service capability orchestration profile might be sufficient.

By leveraging the proposed hierarchy of service orchestration profiles, orchestration can be performed dynamically by distributing profile which may be performed, for example, by the service orchestration management function. In an alternative embodiment, the profile can be pre-configured/pre-provisioned, perhaps, for example, during manufacturing or during deployment.

Service Orchestration Profile Attributes

The service orchestration profiles comprise information that describes the desired service. The format and content of the profile may be any that is suitable for describing the service such that it may implemented. For example, the service profiles may be implemented using XML or JSON format. In an example embodiment, the profiles comprise information corresponding to a set of defined attributes.

In an example embodiment, the service orchestration profiles may comprise information corresponding to the following attributes, each of which is discussed below: profile identifier; profile semantics; profile type; service orchestration targets; service orchestration schedule; service orchestration policies; service orchestration context; desired services; and supported services.

The profile identifier attribute specifies an identifier of the profile. For cases where the profile is hierarchically linked to other profiles, the profile identifier can serve as an address such that the profile can be referenced and linked to by other profiles. In an example embodiment, the profile identifier may be a URI or URL designating a location at which information about the desired service may be obtained. In a scenario wherein the profile is used in a standalone fashion, this identifier may not be required.

The profile semantics attribute specifies a semantic description or an address/link to a semantic description that describes service orchestration attributes contained within the profile. In other words, the profile semantics attribute provides context information regarding the profile attributes which may be used in processing the profile information.

The profile type attribute specifies the type of profile. In an example embodiment, the profile type attribute may be one of two different profile types. A first type of profile specifies a desired set of services to be orchestrated onto a target. A second type of profile specifies the set of services supported by an orchestration target.

The service orchestration targets attribute specifies an optional list of targets on which service orchestration is to be performed upon. For example, the information corresponding to the service orchestration targets may specify one or more of a service node, service layer, and a service capability instance. In an example scenario, service orchestration target information may be included in an orchestration profile when a client includes a profile in a request to perform service orchestration on one or more specified targets. In an alternative scenario, a client may choose not to specify a list of orchestration targets in an orchestration profile and instead rely on a service orchestration management function to determine the targets.

The service orchestration schedule attribute specifies scheduling information for when service orchestration is to be performed and/or a duration of time for which profile is valid.

The service orchestration policies attribute specifies policies to qualify performing service orchestration. Policies may include rules concerning if/when service orchestration is to be performed, or rules concerning the different types of service orchestration that can be performed on different targets or by different clients. These rules can be contingent on service orchestration context. For example, the policies may specify that a particular type of service orchestration is to be made when a particular event or trigger condition (e.g., network or node loading reaching a certain threshold, occurrence of a particular error condition, orchestration request issued by a client of neighboring service node, etc.) is detected.

The service orchestration context attribute specifies context information applicable to the service orchestration. For example, context information may specify a client's identity, location, desired level of quality of service, schedule of availability, type of application, etc. The context information may be referenced by other attributes such as, for example, service orchestration policy attribute.

The desired service attribute specifies the service configuration that an orchestration client is requesting to be orchestrated onto a specified target(s). The desired service attribute is generally applicable only if/when an orchestration profile is being used in a client request to orchestrate a target. If a profile is being used for other purposes such as, for example, to publish a supported set of services, this attribute may not be applicable. In an example embodiment, the desired service attribute may have any of the following types each of which is discussed below: desired network service; desired service node; desired service layer; and desired service capability.

The desired network service type specifies a desired mix and distribution of service node configurations in the network. In an example embodiment, the desired network service type may specify, for example, any of the following: desired number of service nodes; desired location of service nodes; desired computing and network resources allocated to each service node; desired mix and distribution of service layer configurations across service nodes; desired network security scheme used across service nodes; and link(s) to child service node orchestration profile(s) to be used to orchestrate individual service nodes.

The desired service node type specifies a desired configuration of a service node. In an example embodiment, the desired service node type may specify, for example, any of the following: desired number of service layer instances to be hosted on service node; type of each desired service layer instance; desired security scheme supported by service node; desired computer and network resources allocated to each service layer instance on service node; desired peer service nodes with which the service node is to collaborate; and link(s) to desired child service layer orchestration profile(s) to be used to orchestrate individual service layer instances supported by this service node.

The desired service layer type specifies a desired configuration of a service layer. In an example embodiment, the desired service layer type may specify, for example, any of the following: a desired set of service capability instances to be enabled by service layer; a desired cost of using service layer; a desired security/privacy profile of service layer; a desired computing and network resources allocated to each service capability instance supported by service layer; a desired peer service layers with which this service layer is to collaborate; and link(s) to desired child service capability orchestration profile(s) to be used to orchestrate individual service capability instances supported by this service layer.

The desired service capability type specifies a desired configuration of a service capability. Some example embodiments of the type of information specified can include but is not limited to the following: desired set of features to be enabled by service capability; desired cost of using service capability; etc.

Referring again to the attributes comprised in service orchestration profiles, the supported services attribute specifies the set of supported services that an orchestration target supports. Note that this attribute is only applicable if/when a service orchestration profile is being used in a request to publish/advertise supported services (or in a discovery response). If a profile is being used for other purposes (e.g., by an orchestration client to request orchestration of a target) this attribute may not be applicable. In an example embodiment, the supported service attribute may have any of the following types, each of which is discussed below: supported network service; supported service node; supported service layer; and supported service capability.

The supported network service type for the supported services attribute specifies a concise description of supported service nodes in the network. Examples of information that may be included for the supported network service type include, but is not limited to, the following: supported number, location, addresses of service nodes and links to their corresponding child profiles; supported computing and network resources allocated to each service node; supported mix and distribution of service layer configurations across service nodes; and supported network security scheme used across service nodes.

The supported service node type for the supported service attribute specifies a concise description of service layers supported by a service node. Examples of information that may be included for the supported service node type include, but is not limited to, the following: supported number, type, location, and address of service layer instances hosted on a service node and links to their corresponding child profiles; supported security scheme supported by a service node; supported interface description of a service node (e.g. API); peer service nodes; link(s) to supported service layer orchestration profile(s); service provider that owns/manages a service node; cost information for service node; and performance/resource configuration for a service node.

The supported service layer type for the supported services attribute specifies a concise description of service capabilities supported by a service layer. Examples of information that may be included for the supported service layer type include, but is not limited to, the following: set of service capability instances supported by a service layer instance and links to their corresponding child profiles; supported interface description of service layer (e.g. API); cost associated with using service layer; supported security/privacy scheme; computing and network resources allocated to each service capability instance; per service layers that this service layer collaborates with; and supported modes of operation of service layer (e.g. high performance, low cost, free, low energy consumption, etc.).

The supported service capability type for the supported services attribute specifies a concise description of features supported by the service capability. Examples of information that may be included for the supported service capability type include, but is not limited to, the following: set of features supported by a service capability instance; supported interface description of service capability (e.g. API); cost associated with using service capability; supported security/privacy scheme of service capability; peer service capabilities that this service capability collaborates with; and supported modes of operation of service capability (e.g. high performance, low cost, free, low energy consumption, etc.).

Service Orchestration Management Function

The service orchestration management function 840 supports several types of service orchestration including orchestration of a network of service nodes, orchestration of an individual service node, orchestration of an individual service layer, and/or orchestration of an individual service capability. Depending on where the function 840 is deployed in a network, it may support one or more of these types of orchestration. To perform these types of service orchestration, the function 840 relies on the use of service orchestration profiles such as discussed above. The service orchestration management function 840 supports processing service orchestration requests by parsing service orchestration profiles contained within the requests and extracting service orchestration profile attributes.

The service orchestration management functions 840 can be deployed in a hierarchical fashion, similar to their corresponding service orchestration profiles. In other words, the service orchestration management functions can be deployed at the granularity of the network, a node, a service layer, and/or a service capability. Leveraging profiles at each of these levels, the function can support different forms of service orchestration.

A first orchestration supported by the service orchestration management function 840 is dynamically instantiating one or more supported network service nodes (e.g., spawning a new VM and instantiating a new service node on the VM) and coordinating their configuration such that they are compatible and compliment other service nodes in the network. For example, the service orchestration management function might coordinate to ensure each virtual machine (VM) that is spawned has compatible types and versions of service layer software installed on it (e.g., oneM2M v1.0).

Another orchestration supported by the service orchestration management function 840 is dynamically instantiating and starting up one or more instances of supported service layer(s) on service nodes in the network and coordinating the configuration of the service layer instances such that they are compatible and compliment the configuration of other service layer instances in the network. For example, the service orchestration management function 840 might instantiate oneM2M service layer instances and configure these instances to function in specific roles (e.g., Infrastructure Node, Middle Node, Application Specific Node, etc.) and ensure their interfaces are compatible with each other (e.g., use specific port numbers and protocols).

Another orchestration supported by the service orchestration management function 840 is dynamically coordinating the enabling, disabling and configuring specific types of service capabilities (e.g., oneM2M CSFs or ETSI M2M SCs) supported by each service layer instance hosted on the various service nodes throughout the network. For example, the service orchestration management function might coordinate the enabling and configuring of the mandatory set of service capabilities that are needed by a particular group of service layers to interoperate with one another. By way of further example, the service orchestration management function might coordinate the enabling, disabling, and configuration of value-added service capabilities on various service layers throughout the network such that capabilities are distributed to ensure proper mix for load balancing across service layers and availability to perspective clients.

Another orchestration supported by the service orchestration management function 840 is dynamically coordinating the enabling, disabling and configuration of specific types of features supported by each service capability (e.g., store-and-forward feature of the oneM2M CMDH CSF) within the various service layers throughout the network. For example, the service orchestration management function 840 might coordinate the enabling and configuration of the mandatory set of features that are needed to ensure service capability interoperability across the different service layer instances in the network that support the service capability. By way of further example, the service orchestration management function might coordinate the enabling, disabling, and configuration of value-added features of specific service capabilities such that functions are distributed to ensure proper load balancing across service layers and availability to perspective clients.

The service orchestration management function 840 can support one or more interfaces to allow it to send/receive requests to/from orchestration clients, orchestration targets, and other service orchestration management functions in the network. In an example embodiment, a service orchestration interface may be adapted to receive requests from a client (e.g., application or management entity in the network) to have the function 840 perform a specified type of service orchestration based on a requested profile. In response, the management function 840 performs orchestration on a network of service nodes, a specific service node, a specific service layer, or a specific service capability. In another example embodiment, the management function may be adapted to receive a request from a potential orchestration target to publish their service orchestration profile. In response, the management function advertises its supported set of service layers/service capabilities/features, or provides service orchestration context or policies to the function. In yet another embodiment, the management function 840 may be adapted to receive requests from other service orchestration management functions in the network to coordinate service orchestration. For example, in an example scenario, a function hosted on a service node may request a function within a service layer hosted on the node to perform service orchestration of the service layer. In response to such a request, the orchestration management function may request that a function within one of the service capabilities perform service orchestration on the service capability.

Figure 9B:
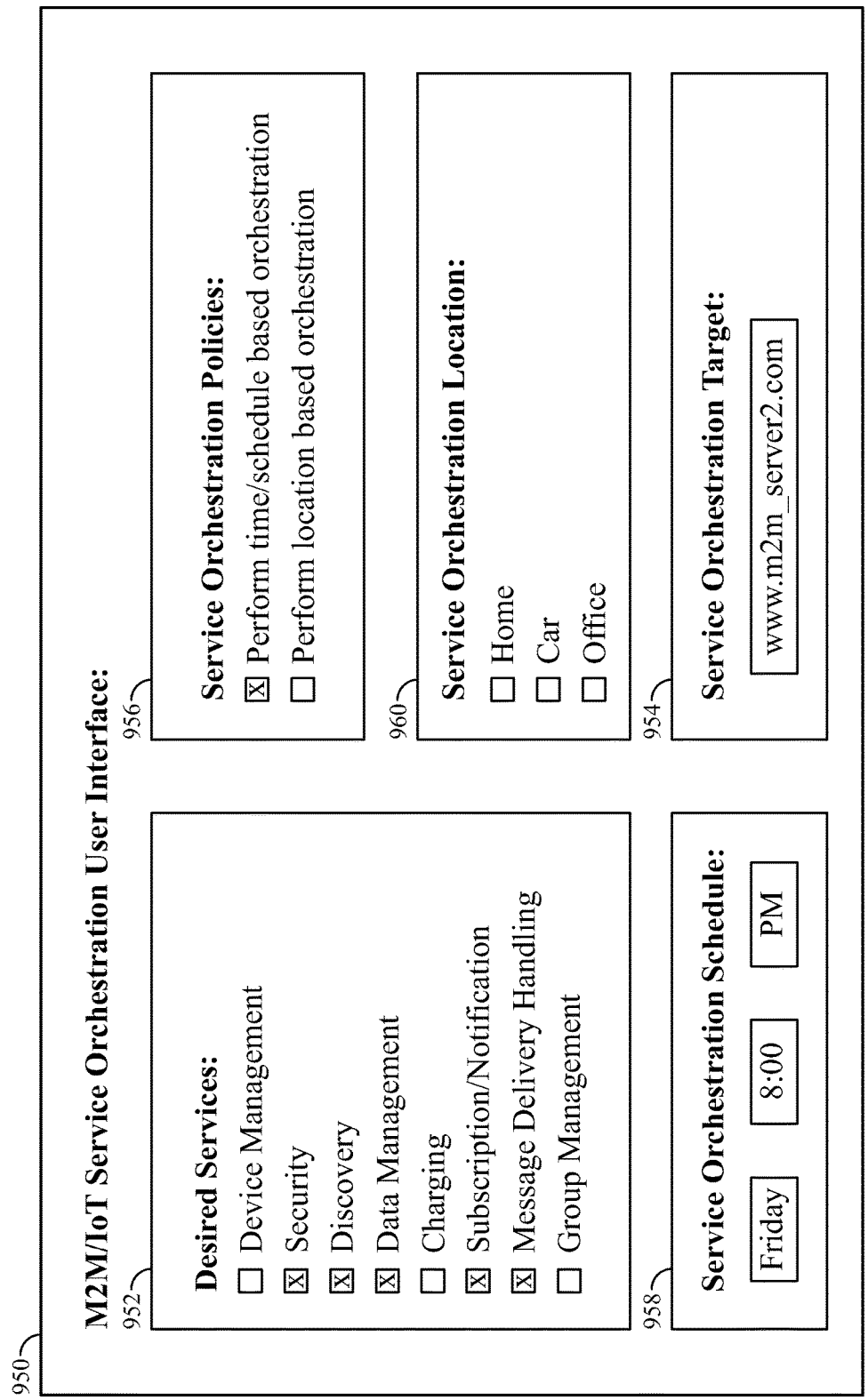
FIG. 9B is a diagram depicting an example user interface.

It will be appreciated that service orchestration management function 840 may generate and display user interfaces with which users may specify desired aspects of the services to be orchestrated. The service orchestration management function 840 uses the information that is entered via the user interfaces to configure profiles consistent with the specified user inputs. FIG. 9B depicts an example user interface 950 that may be provided by a service orchestration management function 840. As shown, the user interface 950 comprises desired services panel 952 with which users may specify the particular services that they are interested in having orchestrated. Using panel 954, a user may specify a particular targeted server, gateway, device, etc. on which the specified set of services is to be enabled. Panel 956 allows the user to specify particular policies dictating if/when orchestration takes place. For example, using panel 956, the user may select that the orchestration should be performed at a particular time or on a particular schedule. Alternatively, using panel 956, the user may specify that the orchestration should be performed depending upon location. In another embodiment, the user interface may allow the user to additionally or alternatively specify that orchestration is to be performed based upon the quality of service that is desired. In the scenario wherein the user selects a policy dictating the orchestration is to be performed based upon a particular time or schedule, the user may specify the details of the time or schedule using panel 958. In the scenario wherein the user selects a policy dictating the orchestration is to be performed based upon location, using panel 960, the user may specify the location that provides the context for determining whether to perform orchestration. Similarly, if quality of service had been specified as the orchestration policy, the user interface would provide a corresponding location for specifying relevant details regarding the desired quality of service. After a user has specified details regarding the desired level of service using interface 950, service orchestration management function 840 may use the specified details to update profile information so as to implement the desired services in the specified manner.

Methods of Orchestrating Services

Figure 10A:
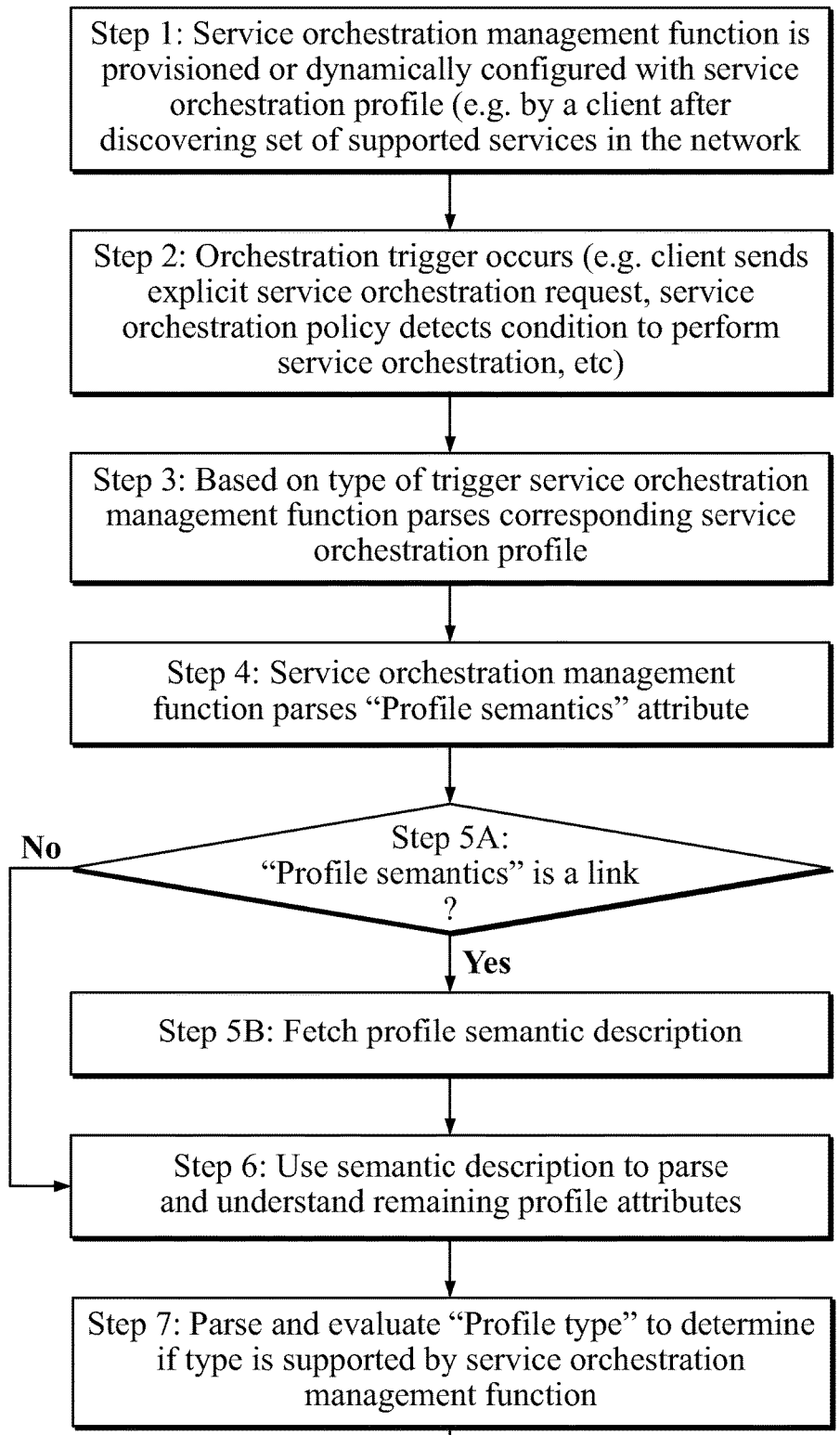
FIGS. 10A-10B present a flow diagram of processing performed during service orchestration.
Figure 10B:
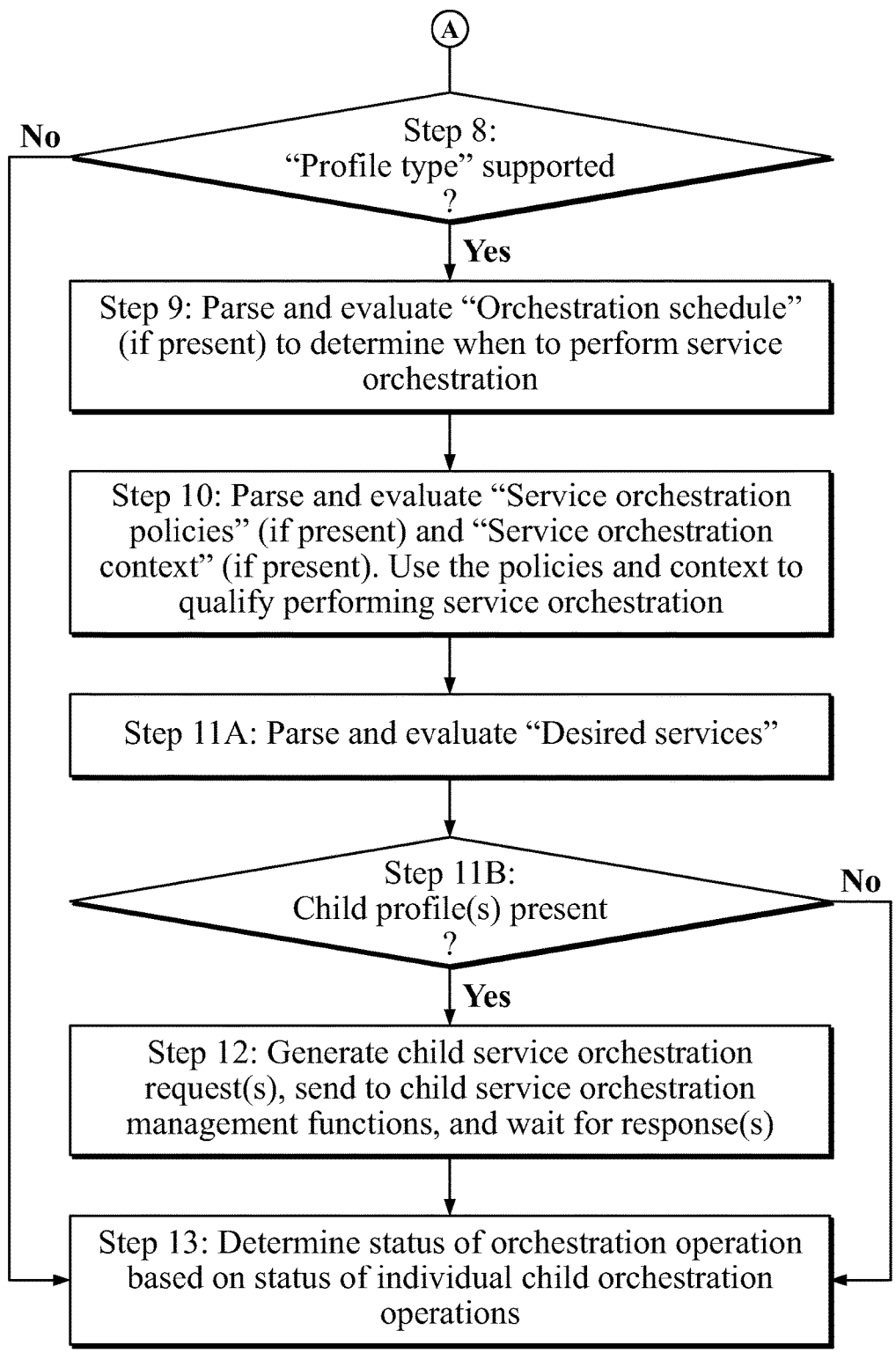

FIGS. 10A-10B depict a flow chart illustrating example processing of requests to perform service orchestration. The processing is performed by service orchestration management functions which may be hierarchically related and which process service orchestration profiles 820 that may be hierarchically related.

Referring to FIG. 10A, at step 1, a service orchestration management function 840 is configured with service orchestration profiles 820. This configuration can be done via pre-provisioning at the time a service node is provisioned or may occur dynamically when, for example, a request is received from an orchestration client or from another service orchestration management function. It will be appreciated that prior to configuring a service orchestration function 840, a prior discovery step may be employed to identify the available set of services supported.

Referring to FIG. 10A, at step 2, an orchestration trigger occurs. For example, the service orchestration management function 840 may receive a request from a client to perform a desired type of orchestration. The request may comprise, or be preceded by, a profile 820 describing the desired service. In another scenario, the service orchestration management function 840 may detect an event which, based on a policy or rule specified in an orchestration profile 820, triggers self-orchestration to be performed.

Referring to FIG. 10A, at step 3, any relevant service orchestration is processed by the service orchestration management function. For example, the function 840 processes the corresponding service orchestration profile(s) associated with the trigger.

Referring to FIG. 10A, at step 4, the service orchestration management function 840 parses the "Profile Semantics" attribute (if present) to determine if it is a semantic description or a link to a semantic description stored elsewhere.

Referring to FIG. 10A, at step 5A, if the service orchestration management function determines the "Profile Semantics" attribute is a link, the service orchestration management function employs the link to fetch the semantic description at step 5B.

At step 6, the service orchestration management function 840 employs the semantic description to parse and understand the individual attributes of the profile 820 using semantic aware techniques.

At step 7 of FIG. 10A, the service orchestration management function 840 parses the "Profile Type" attribute to determine whether the intended orchestration target is a network of service nodes, a service node, a service layer, or a service capability.

At step 8 depicted in FIG. 10B, the service orchestration management function 840 verifies whether it is capable of performing the requested type of service orchestration. If not, it responds to the client with an error condition as noted below in connection with step 13. Otherwise, orchestration management function 840 proceeds to process the request.

At step 9 of FIG. 10B, the service orchestration management function 840 parses the "Service Orchestration Schedule" attribute to determine scheduling information regarding when to perform the requested service orchestration (e.g., date and time).

At step 10 of FIG. 10B, the service orchestration management function 840 parses the "Service Orchestration Policies" and "Service Orchestration Context" attributes to determine whether there are any specified rules and context that further qualify service orchestration. For example, the service orchestration management function 840 may determine if/when service orchestration is to be performed, the types of service orchestration that are allowed/dis-allowed, or the conditions under which service orchestration needs to be adjusted or repeated. Policies may contain dependencies/references to "Service Orchestration Context" attribute. When updates to this context are detected, the service orchestration management function 840 can re-evaluate any applicable policies to determine if/when service re-orchestration is required.

At step 11 of FIG. 10B, the service orchestration management function 840 parses the "Desired Services" attribute to determine the desired set of services that the profile defines to be orchestrated on one or more targets and the corresponding actions the management function 840 must perform. The function 840 also determines whether servicing this request will require it to collaborate with any other service orchestration management functions either hosted locally on the same service node or elsewhere in the network. It does this by checking to see if any additional service orchestration profiles 820 have been referenced (i.e., linked to) or included in the "Desired Services" profile attribute. For example, the "Desired Services" attribute within a service layer profile can reference one or more child service capability profiles 820.

At step 12 of FIG. 10B, if child service orchestration profiles 820 have been included or referenced in the "Desired Services" attribute, the service orchestration management function 840 initiates its own request(s) to the child service orchestration management function(s). If child service orchestration profiles 820 are not explicitly included in the profile, the service orchestration management function 840 can select its own set of child functions based on information it maintains. A parent service orchestration management function 840 may also create new profiles on its children which it can, in turn, trigger. In doing so, the function can coordinate the service orchestration performed by the child service orchestration management function(s) (e.g., by coordinating the service orchestration profiles it makes available to these child functions). Upon receiving the request, these functions handle it using the same method as the one being described here. As a result, a coordinated and hierarchical method of processing service orchestration requests is achieved.

At step 13 of FIG. 10B, after completing its own set of service orchestration actions and confirming that any child service orchestration actions have been performed successfully, the service orchestration management function 840 computes the status of the overall service orchestration operation it was triggered to perform. This status can be returned to a client if an explicit client request triggered the orchestration. Based on this response, a client could determine whether the orchestration was successful, failed, or partially successfully (i.e., some service orchestration was completed but some was not). Using this information, based off of this response, a client could then choose its next action (e.g., perform another round of orchestration or make do with these results).

Service Publishing and Discovery

In addition to orchestrating services for its corresponding network of service nodes, service node, service layer, or service capability, a service orchestration management function 840 also supports methods for keeping an inventory of available services and publishing this inventory via service orchestration profiles 820. The service orchestration management function 840 further supports discovery of the published service orchestration profiles 820. Publishing and discovery of service orchestration profiles 820 enables service orchestration clients (e.g., applications as well as other service orchestration management functions in the network, etc.) with the ability to dynamically discover these profiles and determine the current configuration of a corresponding network of service nodes, service node, service layer, or service capability. In doing so, a client can determine whether the current configuration is adequate or whether orchestration is warranted.

Although service orchestration can leverage service discovery as an underlying and enabling technology, it differentiates itself from service discovery. Service orchestration is a step that typically comes after service discovery and supports features such as the dynamic arrangement, management and coordination of services hosted on a particular service node or across a network of service nodes. Service orchestration can also support features such as coordinating and controlling which services on which service nodes in a network can be used by different clients (e.g., applications as well as other services).

Figure 11:
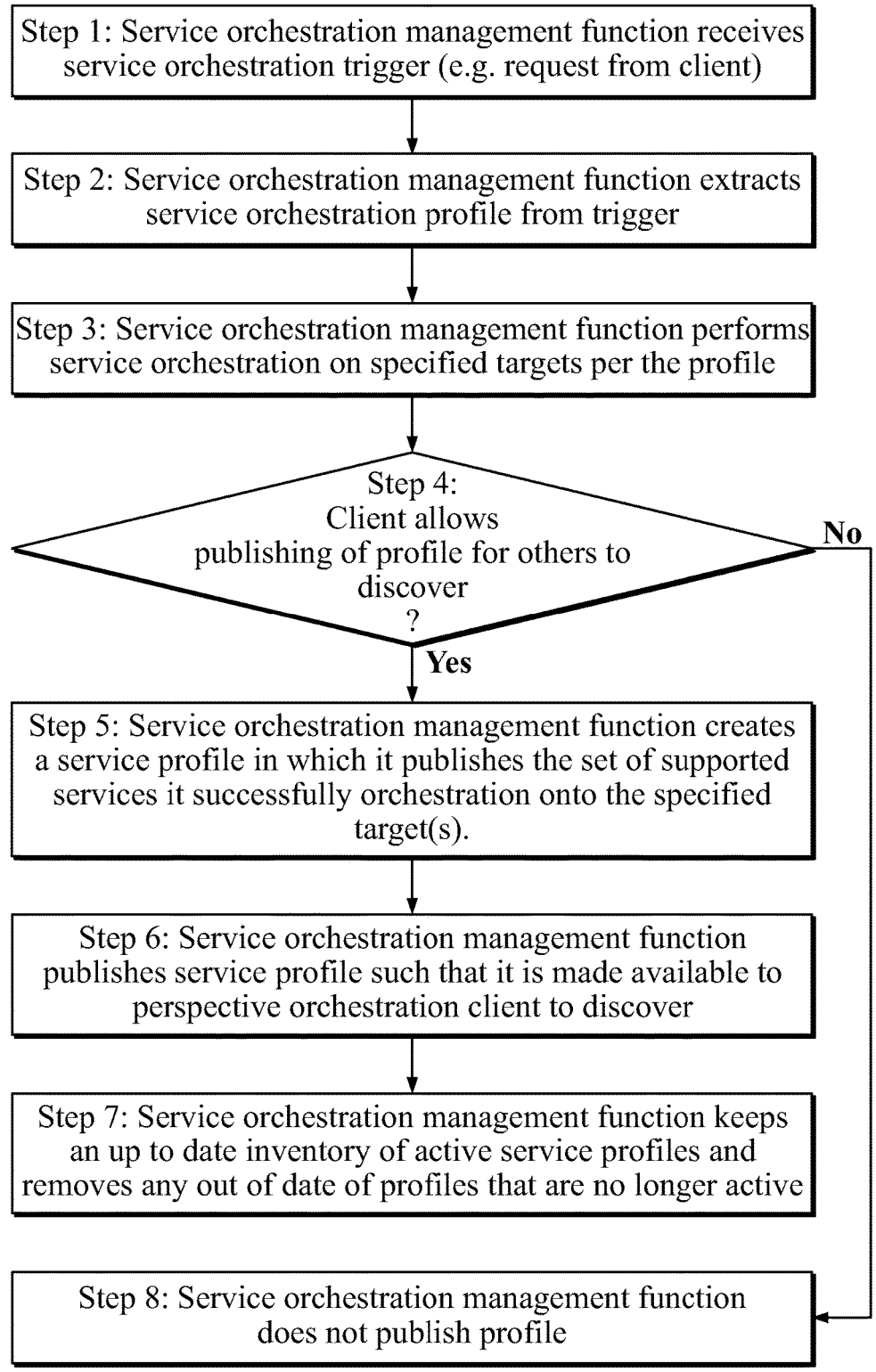
FIG. 11 is a flow diagram of processing performed during service profile publishing.

FIG. 11 depicts a flow chart of processing performed in connection with publishing a service orchestration profile. Referring to FIG. 11, at step 1, a service orchestration management function 840 receives a service orchestration trigger (e.g., request from a client).

At step 2 of FIG. 11, the service orchestration management function 840 can extract the service orchestration profile 820 from the trigger.

At step 3 of FIG. 11, the service orchestration management function 840 performs the desired service orchestration on the specified target(s). For example, the management function 840 may transmit requests along with corresponding service orchestration profiles 820 to its child service orchestration management functions.

At step 4 of FIG. 11, the service orchestration management function 840 determines whether or not it is permitted to publish an orchestration profile 820. For example, the orchestration management function 840 may determine whether it is permitted by the client. If not permitted by the client, the orchestration management function 840, at step 8, does not publish the profile.

If permitted by the client, at step 5 of FIG. 11, the service orchestration management function 840 creates a service profile in which it publishes the set of supported services it successfully orchestrated onto the specified target(s). Within these profiles, supported services for each individual profile can be published such as those proposed in the "Supported Services" attribute discussed above. Alternatively, a service orchestration management function 840 can publishes a service profile template which provides clients with information regarding how clients can perform orchestration. For example, a published service profile template may describe how to create a new service profile or the types of new service profiles that can be created.

At step 6, the service orchestration management function 840 publishes a service profile such that it is made available to perspective orchestration clients to discover. A service orchestration management function 840 may add/update service orchestration applicable context information to the profiles it publishes. For example, the service orchestration management function may add or update the profile information to include the current performance/loading metrics associated with a given profile, the current rates being charged for a profile, etc.

At step 7 of FIG. 11, the service orchestration management function 840 maintains an inventory of the service profiles that are currently active and supported by a network of service nodes, service node, service layer, or service capability. As a consequence, the service orchestration management function 840 can un-publish (i.e., remove) any out of date of profiles that are no longer active.

Figure 12:
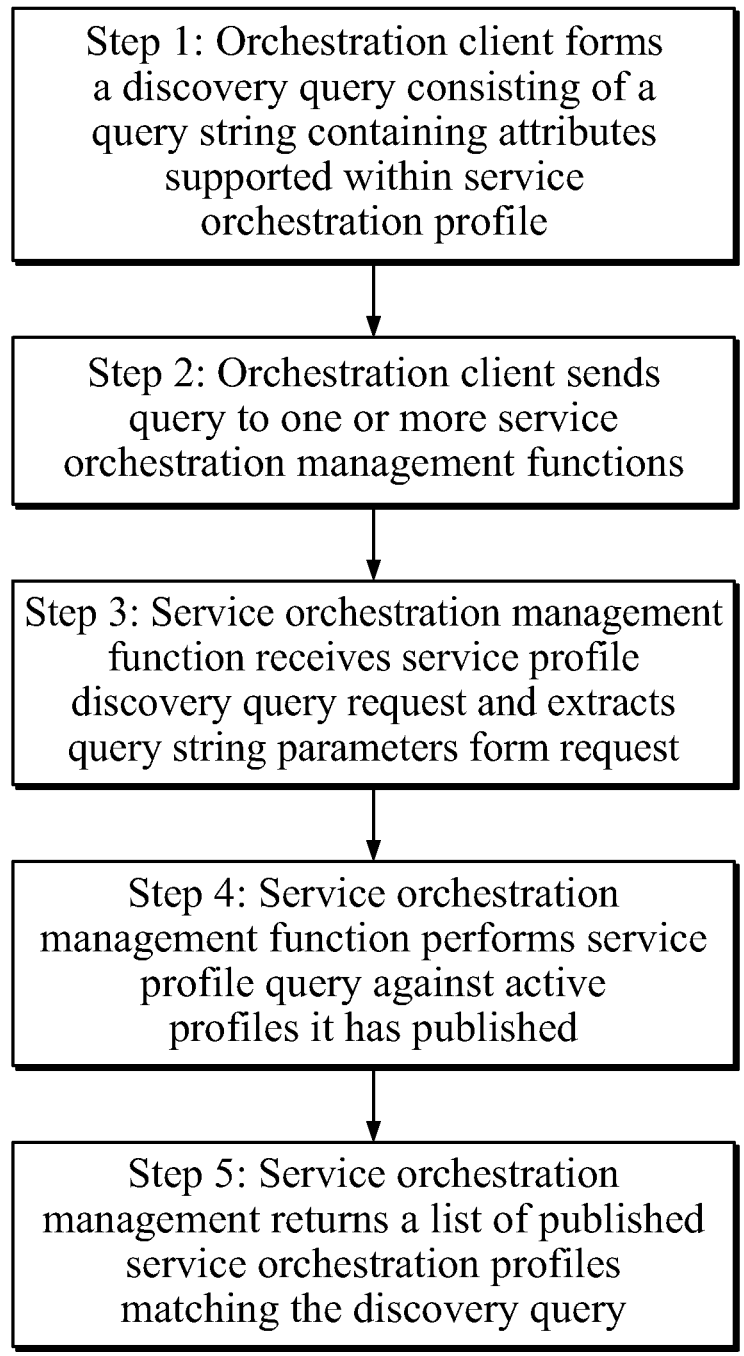
FIG. 12 is a flow diagram of processing performed during service profile discovery.

FIG. 12 depicts a flow chart of processing performed in connection with discovery of service orchestration profiles. Referring to FIG. 12, at step 1, an orchestration client generates a service discovery query consisting of a query containing attributes defined within the service orchestration profile 820 as discussed above.

At step 2 of FIG. 12, the service orchestration client transmits the discovery request to one or more targeted service orchestration management functions 840 in order to discover whether any applicable service nodes, service layers, or service capabilities have service profiles that match the query attributes.

At step 3 of FIG. 12, a service orchestration management function 840 receives the discovery request and extracts the discovery query string.

At step 4 of FIG. 12, the service orchestration management function 840 queries its published set of service profiles against the attributes specified in the query string to determine whether any matching profiles exist.

At step 5 of FIG. 12, the service orchestration management function 840 returns a list or link to a list of any matching service profiles.

OneM2M Service Orchestration Embodiment

The systems and methods for service orchestration may be applied to any of the several different network technologies that make use of services. The disclosed systems and methods have particular applicability to M2M and IoT technologies. For example, the disclosed systems and methods may be implemented in a oneM2M architecture.

Figure 13:
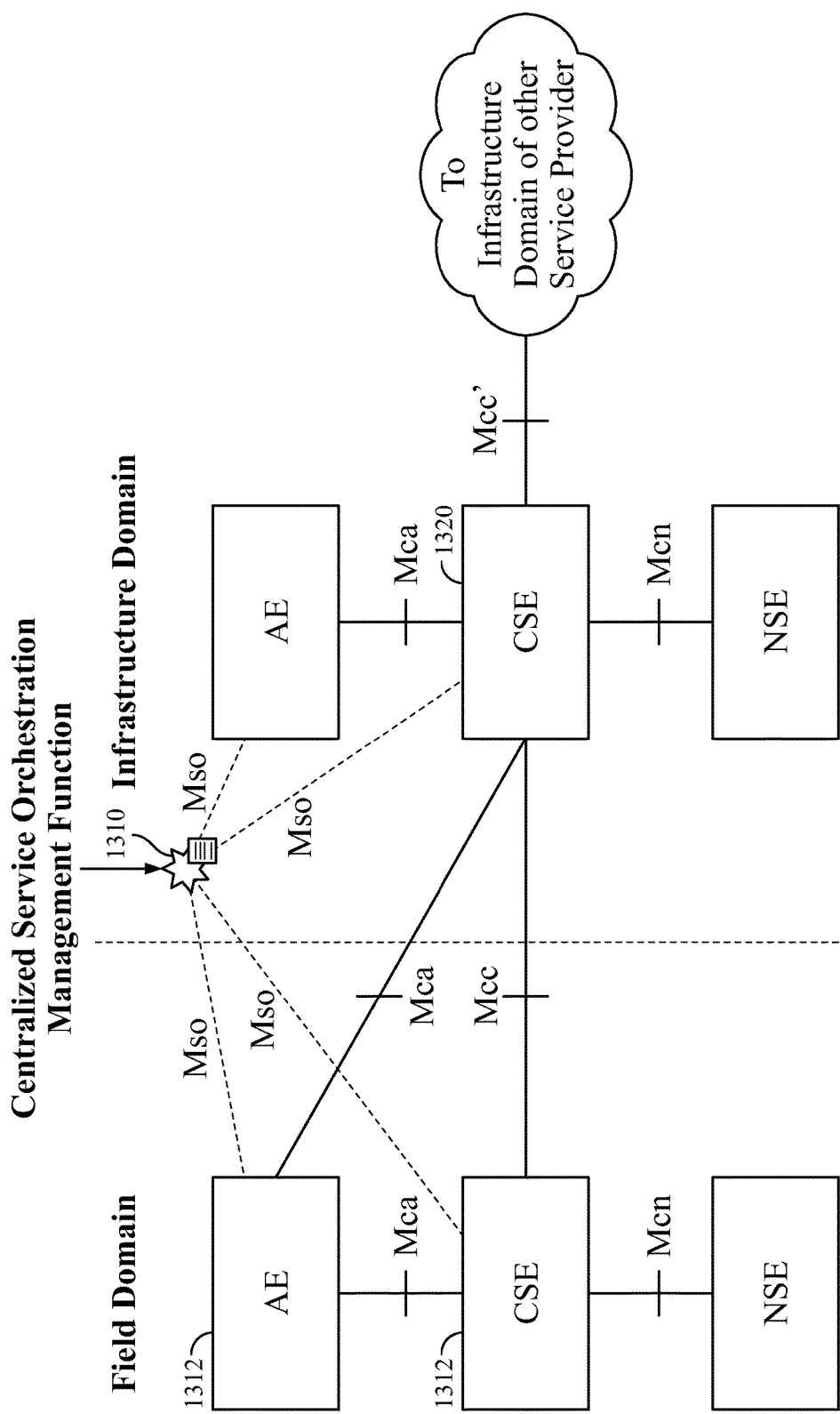
FIG. 13 is a diagram depicting an example oneM2M architecture adapted for service orchestration.

FIG. 13 discloses an example oneM2M architecture adapted to provide service orchestration as described herein. In the particular embodiment of FIG. 13, a centralized service orchestration management function 1310 resides on a centralized node in the network and is made accessible to orchestration clients 1312 (e.g., AEs and CSEs) as well as orchestration targets 1320 (e.g., CSEs). Orchestration profiles are likewise stored on and processed at the centralized node. A new reference point (Mso) is defined for interfacing to this centralized service orchestration management function 1310. The reference point can support the proposed requests discussed above in connection with FIGS. 10, 11, and 12. Using this centralized architecture, orchestration of an individual service node, CSE, or CSF can be supported as well as a network of service nodes, CSEs, and/or CSFs.

Figure 14:
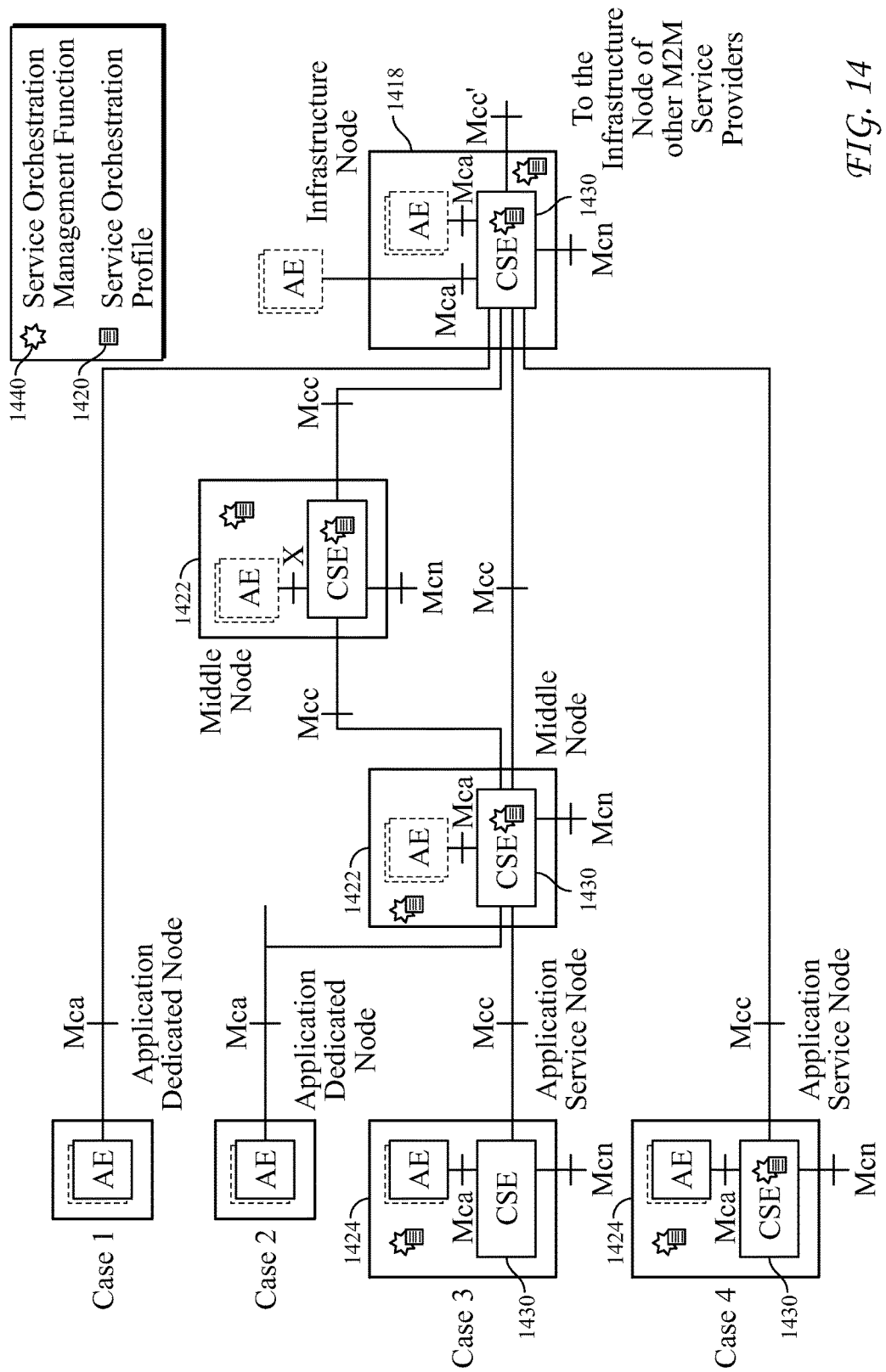
FIG. 14 is a diagram depicting an example oneM2M architecture adapted for service orchestration.

The oneM2M architecture also supports a distributed implementation of service orchestration as described above. FIG. 14 illustrates a distributed implementation of service orchestration. As shown in FIG. 14, a service orchestration management function 1440 executes on each service node (e.g., infrastructure node 1418, middle node 1422, and application specific node 1424) for the purposes of supporting orchestration of an individual service node as well as coordinated orchestration of a network of service nodes. The orchestration management functions process orchestration profiles 1420 as described above in connection with implementing service orchestration. Service orchestration management functions 1440 and corresponding orchestration profiles 1420 may also be hosted on CSEs 1430 executing on the service nodes. In an example embodiment, the service orchestration management functions 1440 may be implemented as a new service orchestration management CSF for purposes of supporting CSE orchestration.

Figure 15:
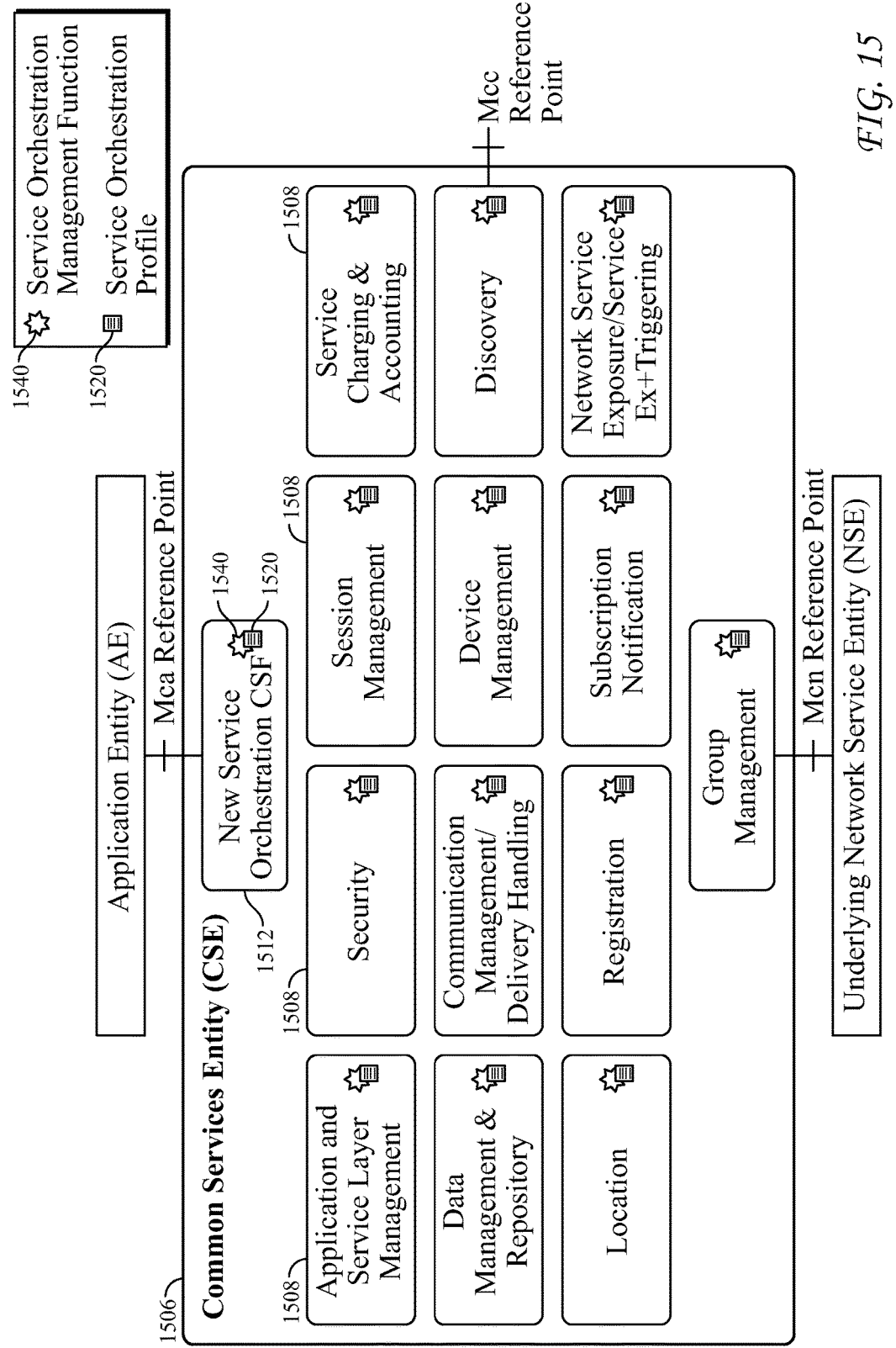
FIG. 15 is a diagram depicting example common service functions comprised in a common service entity.

FIG. 15 is a diagram depicting various common service functions (CSF) 1508 that are hosted on a common services entity (CSE) 1506. In the CSE 1506 depicted in FIG. 15, service orchestration management functions 1540 and corresponding profiles 1520 are hosted on CSF's 1508 and operate as described above in connection with FIGS. 10, 11, and 12. Accordingly, the common service functions and profiles may be distributed within the CSF's 1508 associated with a CSE 1506. In one embodiment, and as also illustrated in FIG. 15, a new common service orchestration CSF 1512 may be created which operates as a centralized node for performing orchestration. Depending upon the particular implementation requirements, either one or both of these embodiments could be used to orchestrate CSFs.

OneM2M Service Orchestration Resources oneM2M applications are frequently implemented using the representational state transfer (RESTful) architecture. In such instances, the CSFs are represented as a set of RESTful "resources." A resource is a uniquely addressable entity in the architecture having a representation that can be manipulated via RESTful methods such as Create, Retrieve, Update, and Delete. These resources are made addressable using Universal Resource Identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information about the resource.

The service orchestration processing as described herein may be implemented using a RESTful resource-based programming interface for the service orchestration management function. Orchestration clients may use RESTful based resources to initiate the service orchestration management function to perform the different types of service orchestration. The resources may also be used by service orchestration management functions and/or to publish the service orchestration profiles that orchestration targets support as well as for collaboration between service orchestration management functions (e.g., exchange of service orchestration profiles).

In an example embodiment, a <profile> resource, which corresponds to the orchestration profile discussed above, may be used to request that a service orchestration management function perform service orchestration on a specified orchestration target. The <profile> resource may also be used by a service orchestration management function to publish service orchestration attributes for corresponding service nodes, CSEs, or CSFs for which the management function is responsible. Likewise, a <profile> resource might also be used to discover published service orchestration attributes of another service node, CSE, or CSF.

Figure 16:
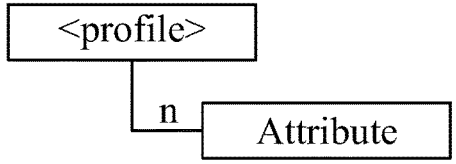
FIGS. 16-20 are diagrams of example service profiles illustrated using oneM2M notation.

FIG. 16 is a diagram illustrating an example embodiment of a <profile> resource corresponding to an orchestration profile as discussed herein. In connection with FIG. 16 (and FIGS. 17-20), the following notations, which are typical of oneM2M notations generally, apply: square boxes are used for resources and child resources; square boxes with round corners are used for attribute; parallelograms are used for collection of resources; multiplicity of each attribute and child resource is defined; and resource names delimited with "<" and ">" indicate names assigned during the creation of the resource. As shown in FIG. 16, the <profile> resource has an example attribute associated therewith. The attribute corresponds to the various attributes that are described above in connection with the orchestration profile. FIG. 16 indicates by way of the variable "n" that the <profile> resource has a multiplicity relationship with the attribute. In other words, the notation indicates there may be "n" of a particular attribute for the <profile>. The following chart indicates for various orchestration profile attributes that are discussed above, the multiplicity that may exist with a RESTful <profile>. For example, as noted in the following chart, there will only be one profileID attribute for a particular <profile>. Likewise, there may only be one type for a particular <profile>. However, with respect to other attributes, such as orchestrationTargets and supportedServices, there may be anywhere from zero to multiple values.

| Attribute Name | Multiplicity |
| --- | --- |
| profileID | 1 |
| profileType | 1 |
| profileSemantics | 0 . . . 1 |
| orchestrationTargets | 0 . . . n |
| orchestrationSchedule | 0 . . . 1 |
| orchestrationPolicies | 0 . . . n |
| orchestrationContext | 0 . . . n |
| desiredServices | 0 . . . n |
| supportedServices | 0 . . . n |

For embodiments where the service orchestration management function is hosted outside or independent of a CSE (i.e., a centralized Service Orchestration Management Function), the <profile> resource can be instantiated independently of the oneM2M defined CSE resource tree. For example, a <profile> resource can be instantiated in a separate resource tree for a centralized service orchestration management function hosted by itself on its own node in the network.

Figure 17:
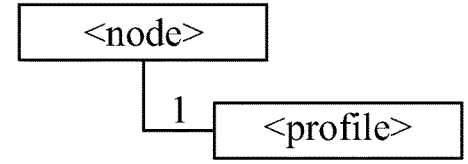

For embodiments where the service orchestration management function is hosted within a CSE or within a CSF, the <profile> resource can be instantiated at various levels within the oneM2M CSE resource tree. In one example embodiment, the <profile> resource can be instantiated under a <node> resource as shown in FIG. 17. This embodiment is well-suited for orchestration of a service node. For example, this particular <profile> resource may be used to orchestrate the number and type of CSEs and/or CSFs supported by a service node. This embodiment might also be used to publish and/or discover a node's service profiles.

Figure 18:
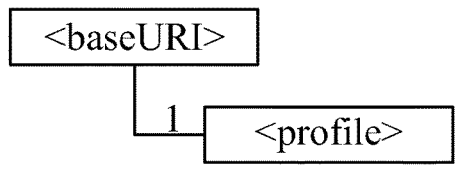
Figure 18:
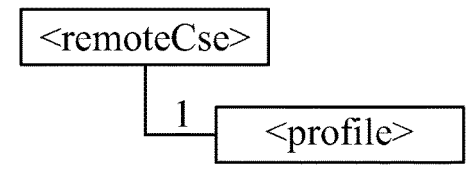

In another embodiment, the <profile> resource can be instantiated under a CSEs <baseURI> resource or under a <remoteCse> resource as shown in FIG. 18. This embodiment is well-suited for orchestration of a CSE (i.e., a service layer) such that the CSE can provide a common/generic configuration to all of its clients (i.e. non-application specific orchestration of a CSE). This embodiment can also be used to publish and/or discover CSE service profiles.

Figure 19:
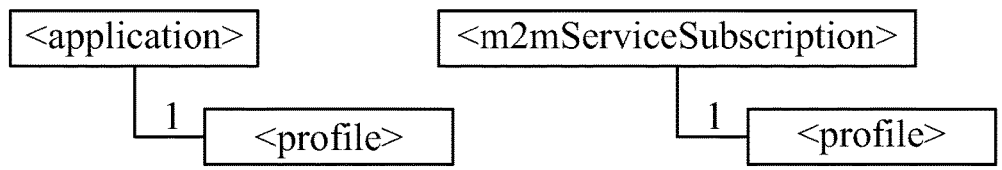

In another embodiment, the <profile> resource can be instantiated under an <application> resource or a <m2mServiceSubscription> resource as shown in FIG. 19. This embodiment is well-suited for orchestration of a CSE such that it provides differentiated services to each of its registered applications rather than a common configuration across all applications. This embodiment can also be used to publish and/or discover a CSEs application-specific supported service profiles.

Figure 20:
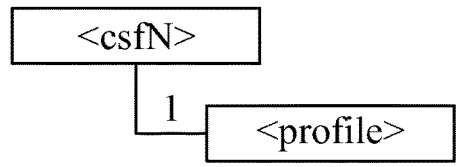

In yet another embodiment, the <profile> resource can be instantiated under one or more CSF-specific resources as shown in FIG. 20. Note that in this embodiment <csfN> is meant to represent a oneM2M defined resource that is applicable to a particular CSF instance. For example, the existing oneM2M specification defines CSF specific resources such as the <container> resource for the DMR CSF, <delivery> resource for the CMDH CSF, and <group> resource for the GMG CSF. By supporting a <profile> sub-resource under a CSF specific resource, this embodiment can be used for orchestration of a particular CSF and the features it supports. This embodiment can also be used to publish and/or discover CSF supported service profiles.

Application Orchestrating CSFs on its Local CSE

Figure 21A:
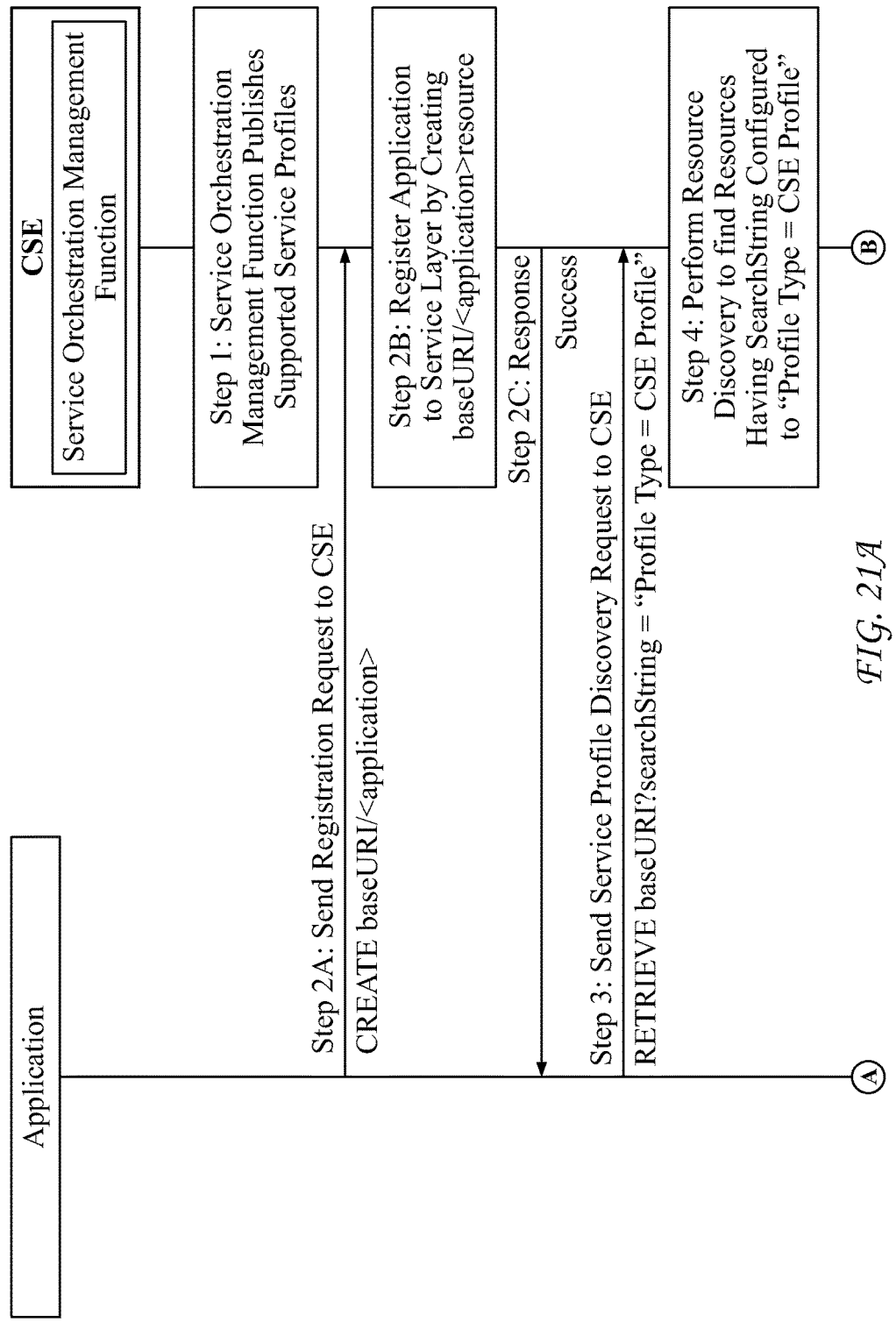
FIGS. 21A-21B present a diagram depicting example processing associated with orchestrating CSFs on a CSE.
Figure 21B:
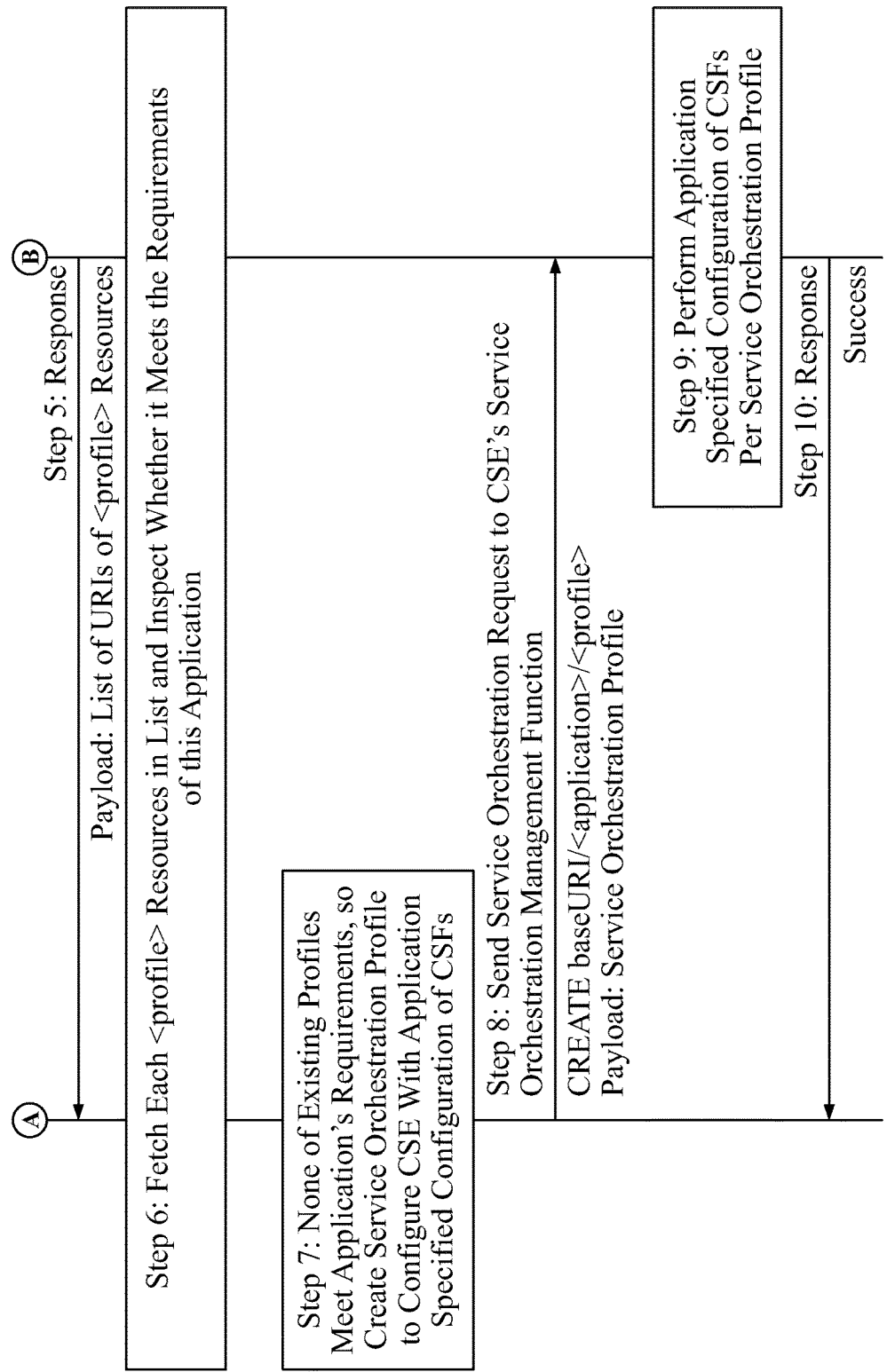

FIGS. 21A-21B present a diagram depicting example processing associated with orchestrating CSFs on a local CSE. In an example scenario, the messaging takes place over the Mso reference point mentioned above in connection with FIG. 13.

Referring to FIG. 21A, at step 1, the service orchestration management function (e.g., 1310 of FIG. 13) on the CSE publishes available CSE service profiles to a local resource (e.g., baseURI/<profile>) using the methods disclosed above.

At step 2 of FIG. 21A, an application successfully performs oneM2M registration to its local CSE. As shown in FIG. 21A, this processing may involve the application sending a particular request (e.g., CREATE baseURO/<application>) at step 2A, which is received and registered to the service layer by creating a corresponding resource (e.g., baseURI/, application) at step 2B. A response indicating success may be transmitted by the CSE to the application at step 2C.

At step 3 of FIG. 21A, an application sends a CSE service profile discovery request to its local CSE looking to find any available CSE service profiles that may support it. As shown in FIG. 21A, in an example scenario, the application may create and transmit a request such as RETRIEVE baseURI?searchString="Profile Type=CSE Profile".

At step 4 of FIG. 21A, the service orchestration management function on the CSE processes the service profile discovery request by performing resource discovery looking for resources that have a searchString attribute configured to "Profile Type=CSE Profile".

At step 5 of FIG. 21B, the CSEs service orchestration management function responds to the application with a list of links to <profile> resources. Each link represents a service profile which the CSE currently supports. The link can include information such as a URI as well as additional service profile attributes which describe the profile.

At step 6 of FIG. 21B, the application optionally fetches one or more profiles to get additional information about the profile(s). The application determines whether any of the profiles meet the requirements of the application.

At step 7 of FIG. 21B, if none of the existing profiles meet an application's requirements, the application creates a new service orchestration profile to configure the CSE with an application specified configuration of the supported CSFs hosted in the CSE.

At step 8 of FIG. 21B, the application generates and transmits a service orchestration request to its local CSE containing the service orchestration profile. This request can be sent to the CSE within a request to CREATE a new <profile> resource. The URI of this request can target baseURI/<application>/<profile> in order for the orchestration to be an application-specific orchestration of the CSE.

At step 9 of FIG. 21B, the service orchestration management function in the CSE processes the service orchestration request by parsing the service orchestration profile as described above in connection with FIGS. 10A-10B. This application specific orchestration can allow the CSE to support differentiated services (e.g., different CSF configurations) for each application that registers to it.

At step 10 of FIG. 21B, the CSE responds to the application with a response indicating whether or not the service orchestration request was successful.

Orchestrating CSFs across a Network of CSEs

FIGS. 22A-22D is a diagram depicting example processing associated with orchestrating CSFs across a network of CSEs.

Figure 22A:
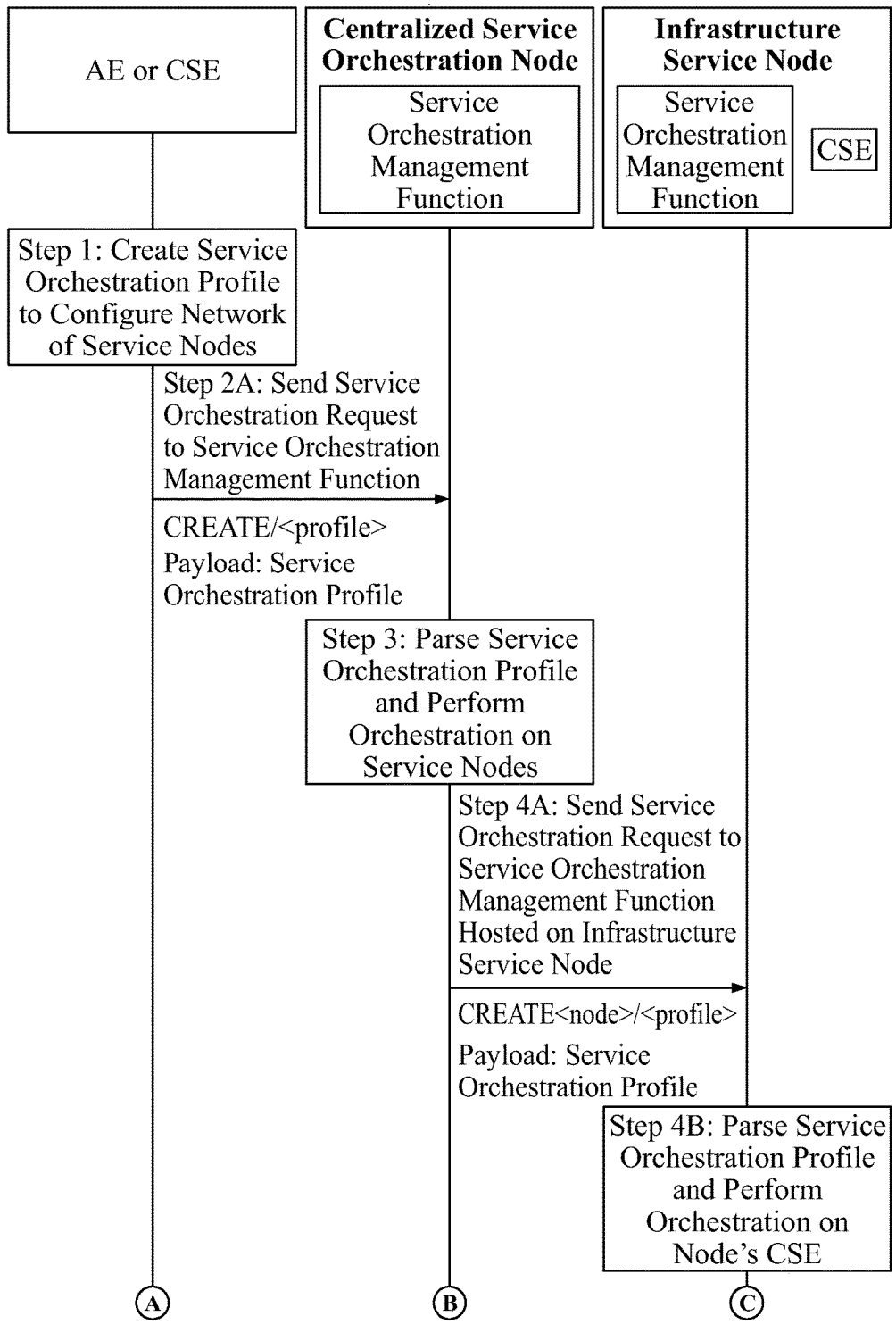
FIGS. 22A-22D present a diagram depicting example processing associated with orchestrating CSFs across a network of CSEs.
Figure 22B:
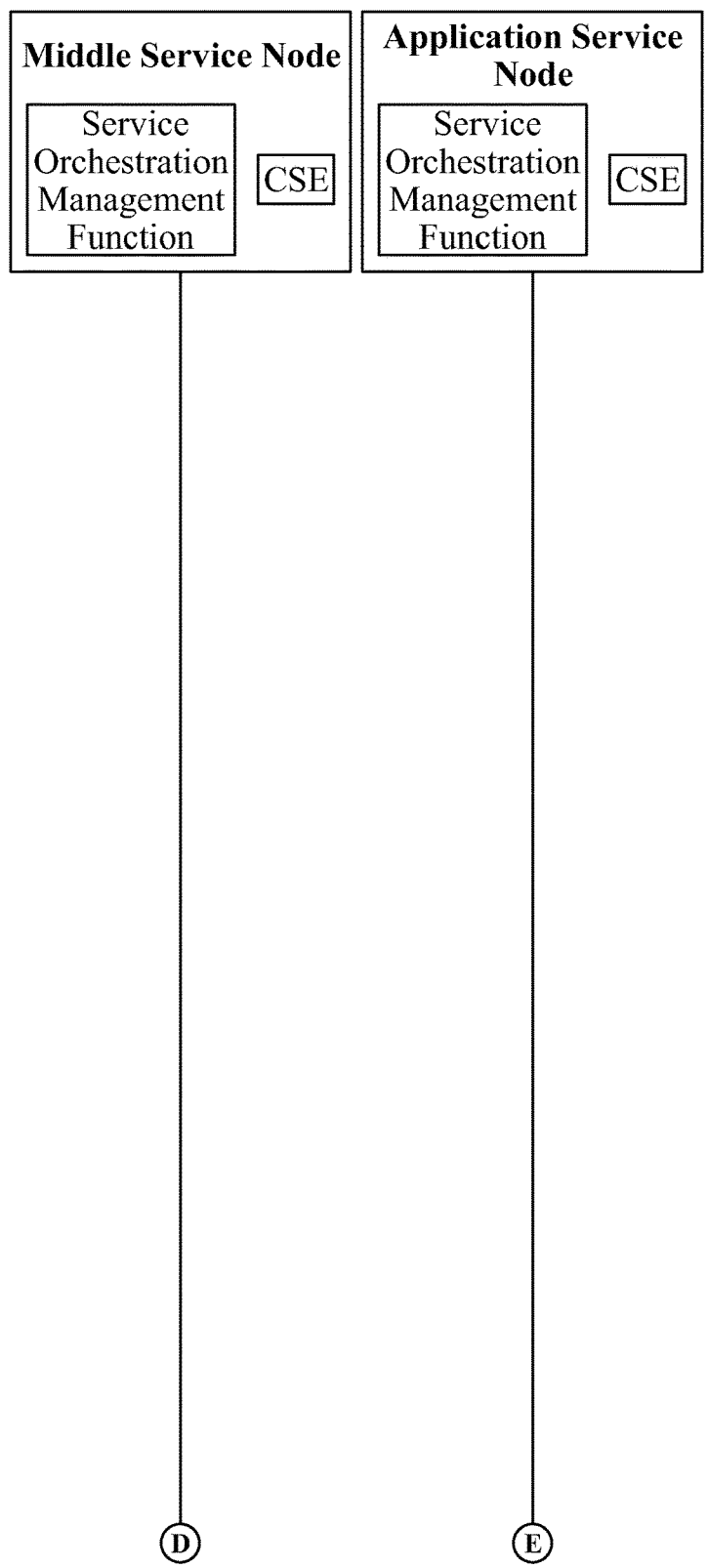

Referring to FIG. 22A, at step 1, the AE or CSE creates a new service orchestration profile to configure the service nodes in the network with CSE configurations that are coordinated with one another. For example, the profile may be to configure service nodes which support CSEs that are of the same type and support a complementary configurations and CSFs).

At step 2A of FIG. 22A, the AE or CSE generates and transmits a service orchestration request to a centralized service orchestration management function in the network. This request can be sent within a request to create a new <profile> resource on the service orchestration management function (e.g., CREATE/<profile> Palpad: Service Orchestration Profile).

At step 3 of FIG. 22A, the service orchestration management function processes the service orchestration request by parsing the service orchestration profile and initiating service orchestration requests to each applicable service node in the network as discussed above in connection with FIGS. 10A-10B.

At step 4A of FIG. 22A, the service orchestration management function on the centralized service orchestration node generates and transmits a service orchestration request to an infrastructure service node in network. In an example scenario the request may be as follows: CREATE <node>/<profile> with a Payload: Service Orchestration Profile. At step 4B, the service orchestration management function on the infrastructure service node processes the request and configures the node's CSE consistent with the processing described above in connection with FIGS. 10A-10B. For example, the service orchestration management function on the infrastructure service node may parse the relevant orchestration profile and perform the relevant orchestration as described above. At step 4C of FIG. 22C, the infrastructure service node sends a response providing status of the processing. In an example scenario, the infrastructure service node indicates the orchestration was a success.

Figure 22C:
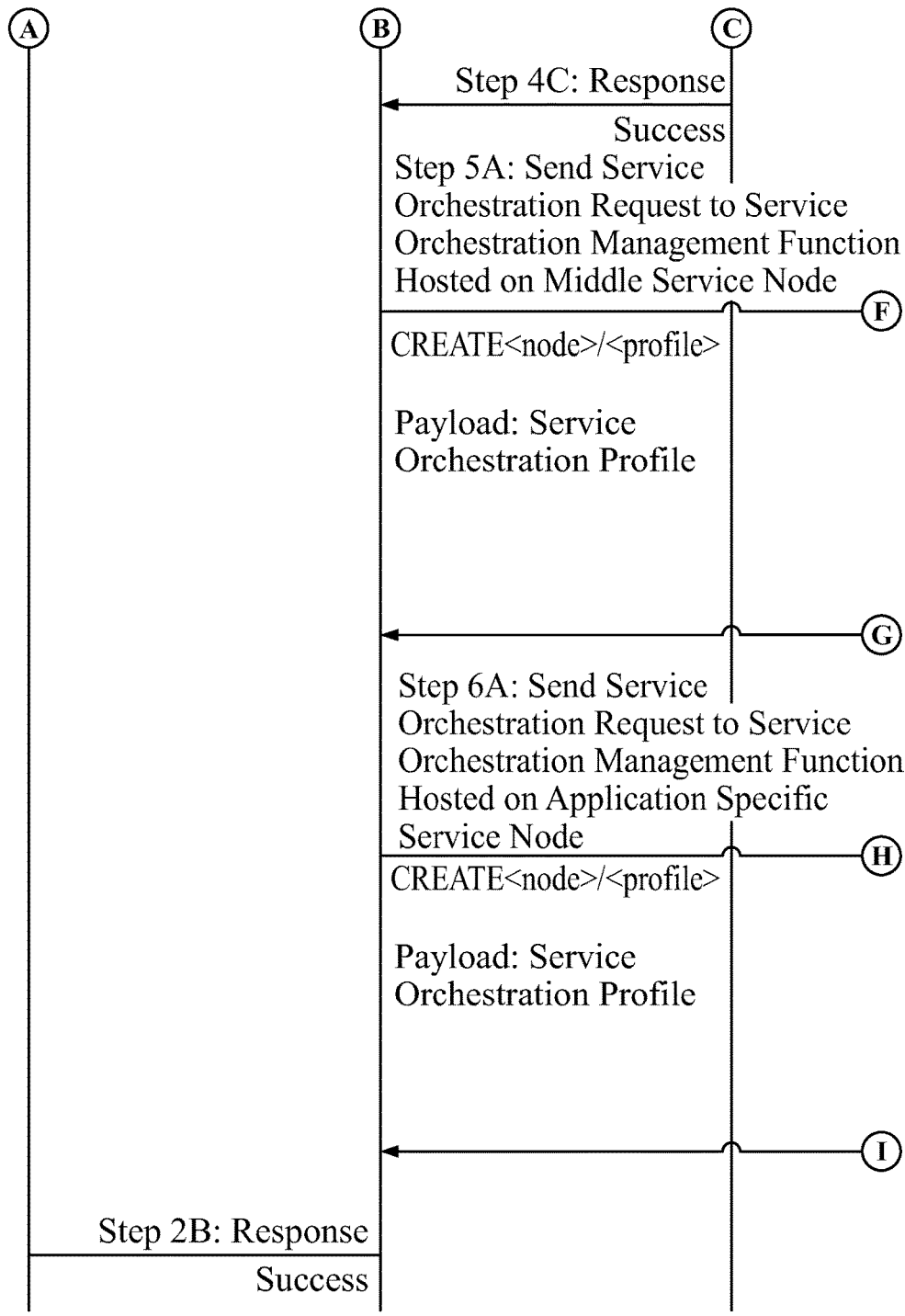
Figure 22D:
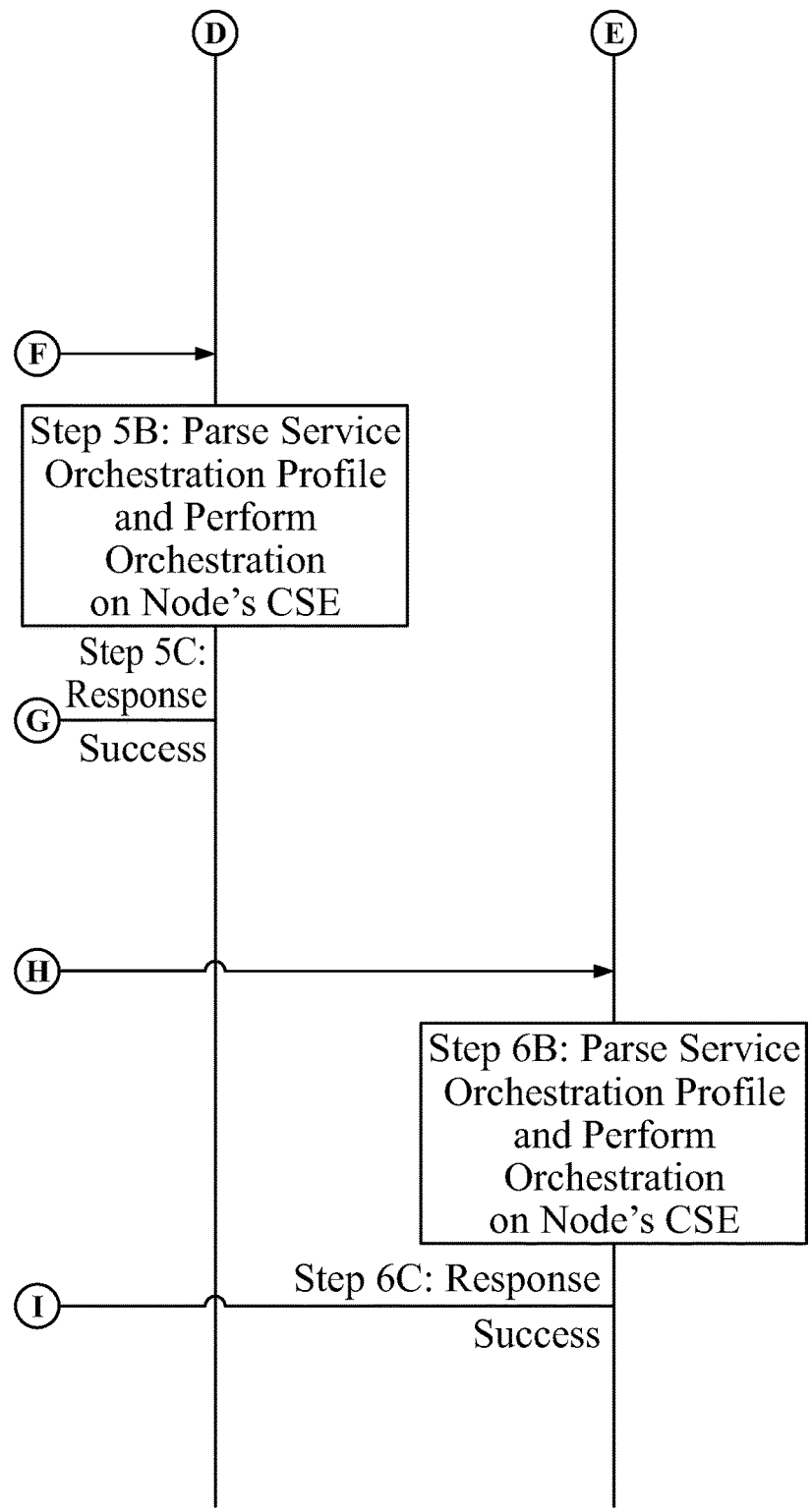

At step 5A of FIG. 22C, the service orchestration management function of the centralized service node generates and transmits a service orchestration request to a middle service node in the network. In an example scenario the request may be as follows: CREATE <node>/<profile> with a Payload: Service Orchestration Profile. At step 5B of FIG.

22D, the service orchestration management function on the middle service node processes the request and configures the node's CSE consistent with the processing described above in connection with FIGS. 10A-10B. For example, the service orchestration management function on the middle service node may parse a received orchestration profile and perform the corresponding orchestration. At step 5C of FIG. 22D, the middle service node sends a response providing status of the processing. In an example scenario, the middle service node indicates the orchestration was a success.

At step 6A of FIG. 22C, the service orchestration management function of the centralized service node generates and transmits service orchestration requests to application specific service node in the network. In an example scenario the request may be as follows: CREATE <node>/<profile> with a Payload: Service Orchestration Profile. At step 6B of FIG. 22D, the service orchestration management function on the application specific service node processes the request and configures the node's CSE consistent with the processing described above in connection with FIGS. 10A-10B. For example, the service orchestration management function on the application service node may parse a received orchestration profile and perform the corresponding orchestration. At step 6C of FIG. 22D, the application service node sends a response providing status of the processing. In an example scenario, the application service node indicates the orchestration was a success.

At step 2B of FIG. 22C, the service orchestration management function of the centralized service node generates and transmits a status response to the AE or CS that originally requested the orchestration. In an example scenario, the centralized service node indicates that the orchestration was successful.

XML-Based Service Orchestration Profile Hierarchy

The service orchestrations profiles that are described above may be implemented in any suitable format and employ any suitable technology. For example, the service orchestration profiles may be XML or WSDL formatted files. Listed below is an example orchestration file that is formatted in XML. This particular example shows an orchestration profile that may be created by, for example, a client (e.g., application) to request orchestration of a oneM2M CSE to make a certain set of CSFs available to the client. In this particular example embodiment, only a subset of service orchestration profile attributes that are discussed above are applicable. The example XML encoded profile includes such attributes as a profile type (i.e., CSE_ORCHESTRATE), a targeted CSE to be orchestrated (i.e., cseXYZ), a scheduled time to perform the orchestration (i.e., 2014-10-24-06:00), a policy to qualify the orchestration (i.e., only perform service orchestration if CSE is a publically available CSE), and a desired set of services (i.e., oneM2M CMDH, REG and DMR services) including information about each service (e.g., title, link to profile, cost, access, performance, peers, etc.). For each XML element shown, an example value of a service orchestration profile attribute is shown for added clarity and readability.

```
<?xml version="1.0"?>
<profile>
    <profileID>
        <title>oneM2M CSE Profile XYZ</title>
        <link>http://m2mServiceProviderXYZ.com/cseXYZ/profile
        </link>
    </profileID>
    <profileSemantics>
        <link>http://oneM2M.semantics.com/profiles/cse</link>
```

```
    </profileSemantics>
    <profileType>CSE_ORCHESTRATE</profileType>
    <orchestrationTargets>
        <link>http://node001.com/cseXYZ</link>
    </orchestrationTargets>
    <orchestrationSchedule>
        <start>2014-10-24-06:00</start>
    </orchestrationSchedule>
    <orchestrationPolicies>
        <rule>CSE is Public</rule>
    </orchestrationPolicies>
    <desiredServices>
     <service>
        <title>CMDH</title>
        <link>http://m2mServiceProviderXYZ.com/CMDH/profile
        </link>
        <cost>FREE</cost>
        <access>PUBLIC</access>
        <performance>BEST EFFORT</performance>
        <peers>
            <link>http://node002.com:9034</link>
            <link>http://node003.com:9034</link>
        </peers>
     </service>
     <service>
        <title>REG</title>
        <link>http://m2mServiceProviderXYZ.com/REG/profile
        </link>
        <cost>FREE</cost>
        <access>PUBLIC</access>
        <performance>BEST EFFORT</performance>
        <peers>
            <link>http://node002.com:9020</link>
            <link>http://node003.com:9020</link>
        </peers>
     </service>
     <service>
        <title>DMR</title>
        <link>http://m2mServiceProviderXYZ.com/DMR/profile
        </link>
        <cost>FREE</cost>
        <access>PUBLIC</access>
        <storage>4GB</storage>
        <performance>BEST EFFORT</performance>
     </service>
    </desiredServices>
</profile>
```

JSON-Based Service Orchestration Profile Hierarchy

Service orchestration profiles may be formatted using JSON. Listed below is an example of a JSON formatted profile. This particular example embodiment is one which might be created by a CSE for publication so that it can be discovered and/or used by other entities in the network such as, for example, applications, service orchestration management functions, etc. This particular example includes a particular subset of the potential service orchestration profile attributes that are applicable to the intended use of the profile. In this particular example profile, the JSON encoded profile includes such attributes as a profile type (i.e., CSE), a targeted CSE to be orchestrated (i.e., cseXYZ), service orchestration context (i.e., CSE is currently accepting orchestration requests), and a supported set of services (i.e., oneM2M CMDH, REG and DMR services) including information about each service (e.g., title, link to profile, cost, access, performance, peers, etc.). For each JSON element shown, an example value of a service orchestration profile attribute is shown for added clarity and readability.

```
{
  "profile": {
     "profileID": {
        "title":"oneM2M CSE Profile XYZ",
        "link":"http://m2mServiceProviderXYZ.com/cseXYZ/profile"
     }
  "profileSemantics": {
     "link":"http://oneM2M.semantics.com/profiles/cse"
  }
  "profileType":"CSE_PUBLISH",
  "orchestrationTargets": {
     "link":"http://node001.com/cseXYZ"
  }
  "orchestrationContext": {
    "context":"Currently allowing CSE orchestration requests"
  }
  "supportedServices": {
   "service": {
      "title":"CMDH",
      "link":"http://m2mServiceProviderXYZ.com/cseXYZ/cmdh_profile"
      "cost":"FREE",
      "access":"PUBLIC",
      "performance":"BEST EFFORT",
      "peers": {
         "link":"http://node002.com:9034",
         "link":"http://node003.com:9034"
      }
   }
  }
  "service": {
      "title":"REG",
      "link":"http://m2mServiceProviderXYZ.com/cseXYZ/reg_profile"
      "cost":"FREE",
      "access":"PUBLIC",
      "performance":"BEST EFFORT"
      "peers": {
         "link":"http://node002.com:9020",
         "link":"http://node003.com:9020"
      }
  }
  }
  "service>
     "title":"DMR",
     "link":"http://m2mServiceProviderXYZ.com/cseXYZ/dmr_profile"
     "cost":"FREE",
     "access":"PUBLIC",
     "storage":"4GB",
     "performance":"BEST EFFORT"
  }
   }
  }
}
```

WSDL-Based Service Orchestration Profile Hierarchy

The service profiles might also be encoded using WSDL. In a first example orchestration profile formatted using WSDL, a child element may be added under the root 'description' element within the WSDL template. For example, the child element may be called 'profile' as shown in the listing below. Under the 'profile' element, child elements are defined that correspond to each of the orchestration service profile attributes described above.

```
<wsdl:description>
  <wsdl:types/>
  <wsdl:interface/>
  <wsdl:binding/>
  <wsdl:service/>
  <wsdl:profile>
     <profileID>
         <title>oneM2M CSE Profile XYZ</title>
         <link>http://m2mServiceProviderXYZ.com/cseXYZ/profile
         </link>
     </profileID>
     <profileSemantics>
         <link>http://oneM2M.semantics.com/profiles/cse</link>
     </profileSemantics>
     <profileType>CSE_ORCHESTRATE</profileType>
     <orchestrationTargets>
```

-continued

```
         <link>http://node001.com/cseXYZ</link>
     </orchestrationTargets>
     <orchestrationSchedule>
        <start>2014-10-24-06:00</start>
     </orchestrationSchedule>
     <orchestrationPolicies>
         <rule>CSE is Public</rule>
     </orchestrationPolicies>
     <desiredServices>
       <service>
          <title>CMDH</title>
          <link>http://m2mServiceProviderXYZ.com/CMDH/profile
          </link>
          <cost>FREE</cost>
          <access>PUBLIC</access>
          <performance>BEST EFFORT</performance>
          <peers>
             <link>http://node002.com:9034</link>
             <link>http://node003.com:9034</link>
          </peers>
       </service>
       <service>
          <title>REG</title>
          <link>http://m2mServiceProviderXYZ.com/REG/profile
          </link>
          <cost>FREE</cost>
          <access>PUBLIC</access>
          <performance>BEST EFFORT</performance>
          <peers>
             <link>http://node002.com:9020</link>
             <link>http://node003.com:9020</link>
          </peers>
       </service>
       <service>
          <title>DMR</title>
          <link>http://m2mServiceProviderXYZ.com/DMR/profile
          </link>
          <cost>FREE</cost>
          <access>PUBLIC</access>
          <storage>4GB</storage>
          <performance>BEST EFFORT</performance>
       </service>
     </desiredServices>
  </wsdl:profile>
</wsdl:description>
```

In a second example embodiment formatted using WSDL, new child elements are added under existing WSDL elements for each of the corresponding service orchestration profile attributes. For example, select service orchestration profile attributes may be added under the 'types', 'interface', 'binding' and/or 'service' elements. Various permutations and combinations of service orchestration profile attributes could be interspersed under one or more WSDL child elements in order to enhance WSDL with service orchestration capabilities. In the example embodiment listed below, attributes are added under the 'service' element.

```
<wsdl:description>
 <wsdl:types>
 <wsdl:interface>
 <wsdl:binding>
 <wsdl:service>
     <profileID>
       <title>oneM2M CSE Profile XYZ</title>
       <link>http://m2mServiceProviderXYZ.com/cseXYZ/profile</link>
     </profileID>
     <profileSemantics>
         <link>http://oneM2M.semantics.com/profiles/cse</link>
     </profileSemantics>
     <profileType>CSE_ORCHESTRATE</profileType>
     <orchestrationTargets>
        <link>http://node001.com/cseXYZ</link>
     </orchestrationTargets>
     <orchestrationSchedule>
```

-continued

```
    <start>2014-10-24-06:00</start>
  </orchestrationSchedule>
  <orchestrationPolicies>
    <rule>CSE is Public</rule>
  </orchestrationPolicies>
  <desiredServices>
    <service>
      <title>CMDH</title>
      <link>http://m2mServiceProviderXYZ.com/CMDH/profile
      </link>
      <cost>FREE</cost>
      <access>PUBLIC</access>
      <performance>BEST EFFORT</performance>
      <peers>
        <link>http://node002.com:9034</link>
        <link>http://node003.com:9034</link>
      </peers>
    </service>
    <service>
      <title>REG</title>
      <link>http://m2mServiceProviderXYZ.com/REG/profile</link>
      <cost>FREE</cost>
      <access>PUBLIC</access>
      <performance>BEST EFFORT</performance>
      <peers>
        <link>http://node002.com:9020</link>
        <link>http://node003.com:9020</link>
      </peers>
    </service>
    <service>
      <title>DMR</title>
      <link>http://m2mServiceProviderXYZ.com/DMR/profile</link>
      <cost>FREE</cost>
      <access>PUBLIC</access>
      <storage>4GB</storage>
      <performance>BEST EFFORT</performance>
    </service>
  </desiredServices>
</wsdl:description>
```

Example Computing Environment

Figure 23A:
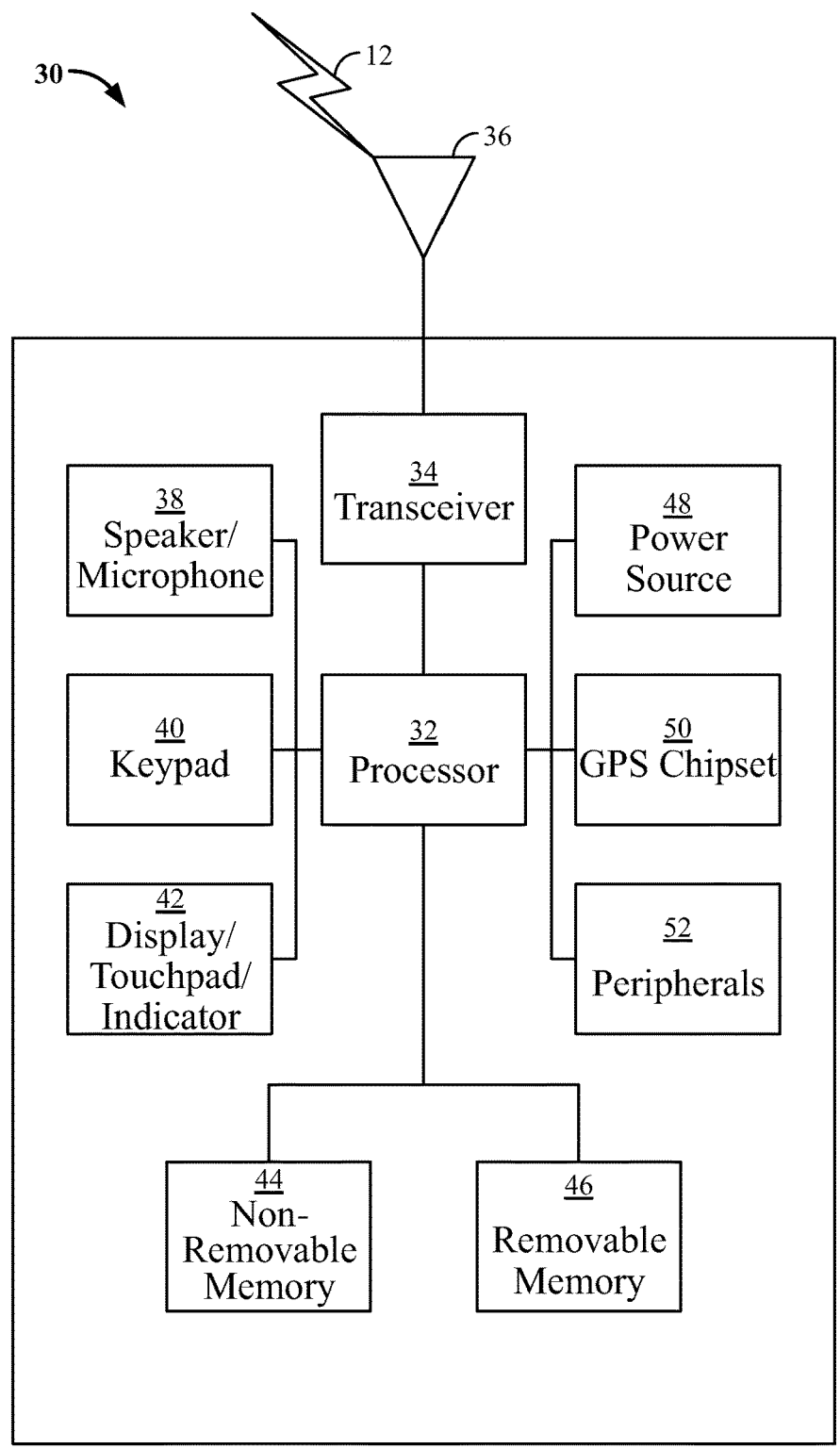
FIG. 23A is a diagram of an exemplary computing terminal or gateway device that may be used to implement the systems and methods described herein.

FIG. 23A is a system diagram of an example wireless device 30, which may be, for example, a terminal device, user equipment (UE), or gateway device. For example, device 30 may be employed by users in network application domain 210 and have applications executing thereon that communicate data with systems in network services domain 212 as referenced in connection with FIG. 2 and throughout this application. By way of further non-limiting example, wireless device 30 may be any of gateways 226 described throughout the specification including in connection with FIG. 2. Further, the device 30 may be used to implement devices in device application domain 214 as referenced in connection with FIG. 2 and elsewhere in the specification. Device 30 is adapted to transmit and receive signals via a communication network or direct radio link. As shown in FIG. 23A, the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. In an example embodiment, display/touchpad/indicator(s) 42 may comprise one or more indicators that operate as part of a user interface. It will be appreciated that the device 40 may include any sub-combination of the foregoing elements while remaining consistent with an embodiment. This device may be a device that uses the disclosed serving gateway extensions for inter-system mobility systems and methods.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 23A depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, and/or receive signals from, an eNode-B, Home eNode-B, WiFi access point, etc. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 23A as a single element, the device 30 may include any number of transmit/receive elements 36. More specifically, the device 30 may employ MIMO technology. Thus, in an embodiment, the device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling the device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 30 may receive power from the power source 48, and may be configured to distribute and/or control the power to the other components in the device 30. The power source 48 may be any suitable device for powering the device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 23B:
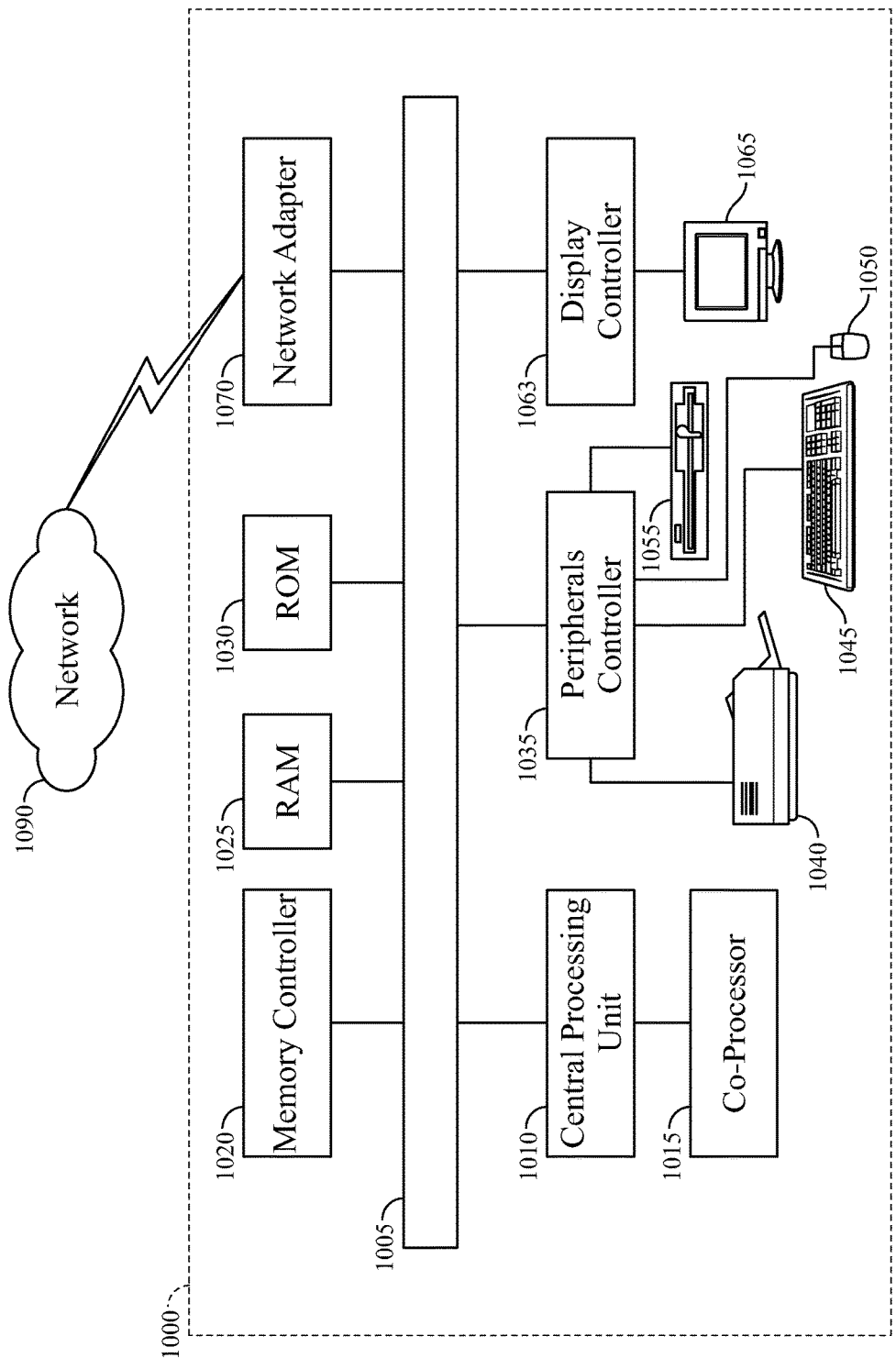
FIG. 23B is diagram of an exemplary computing system that may be used to implement the systems and methods described herein.

FIG. 23B depicts a block diagram of an exemplary computing system 1000 that may be used to implement the systems and methods described herein. For example, the computing system 1000 may be used to implement devices that operate as, for example, service nodes, servers, and application systems such as referenced herein. In particular, computing system 1000 may be used to implement servers 220 described in connection with FIG. 2 and throughout the specification. The computing system 1000 may be controlled primarily by computer readable instructions that may be in the form of software. The computer readable instructions may include instructions for the computing system 1000 for storing and accessing computer readable instructions themselves. Such software may be executed within a central processing unit (CPU) 1010 to cause the computing system 1000 to perform the processes or functions associated therewith. In many known computer servers, workstations, personal computers, or the like, the CPU 1010 may be implemented by micro-electronic chips CPUs called microprocessors.

In operation, the CPU 1010 may fetch, decode, and/or execute instructions and may transfer information to and from other resources via a main data-transfer path or a system bus 1005. Such a system bus may connect the components in the computing system 1000 and may define the medium for data exchange. The computing system 1000 may further include memory devices coupled to the system bus 1005. According to an example embodiment, the memory devices may include a random access memory (RAM) 1025 and read only memory (ROM) 1030. The RAM 1025 and ROM 1030 may include circuitry that allows information to be stored and retrieved. In one embodiment, the ROM 1030 may include stored data that cannot be modified. Additionally, data stored in the RAM 1025 typically may be read or changed by CPU 1010 or other hardware devices. Access to the RAM 1025 and/or ROM 1030 may be controlled by a memory controller 1020. The memory controller 1020 may provide an address translation function that translates virtual addresses into physical addresses as instructions are executed.

In addition, the computing system 1000 may include a peripherals controller 1035 that may be responsible for communicating instructions from the CPU 1010 to peripherals, such as, a printer 1040, a keyboard 1045, a mouse 1050, and data a storage drive 1055. The computing system 1000 may further include a display 1065 that may be controlled by a display controller 1063. The display 1065 may be used to display visual output generated by the computing system 1000. Such visual output may include text, graphics, animated graphics, video, or the like. The display controller 1063 may include electronic components that generate a video signal that may be sent to the display 1065. Further, the computing system 1000 may include a network adaptor 1070 that may be used to connect the computing system 1000 to an external communication network such as the network 1090.

Accordingly, Applicants have disclosed example systems and methods for orchestrating services. In the example systems and methods, service orchestration profiles specify attributes defining the desired services. The service orchestration profiles may be distributed amongst nodes and hierarchically related to each other. Service orchestration management functions process the information in the service orchestration profiles in order to determine the desired services and use the information to implement the desired services. The disclosed systems and methods provide for the automated and dynamic coordination, configuration, arrangement and management of services supported by a single service node or a network of distributed service nodes (e.g., a cloud-based deployment or a Web-based services deployment).

It will be appreciated that while illustrative embodiments have been disclosed, the scope of potential embodiments is not limited to those explicitly set out. For example, while the system has been described with primary reference to the oneM2M architecture, the envisioned embodiments extend beyond implementations using a particular architecture or technology. For example, the potential embodiments also comprise Web services embodiments. The potential implementations extend to all types of service layer architectures, systems, and embodiments.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems or devices, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

The following is a list of acronyms relating to service level technologies that may appear in the above description.
E2E End-to-End
IoT Internet of Things
IP Internet Protocol
M2M Machine to Machine
SC Service Capability
SCL Service Capability Layer
CSF Capability Service Function
CSE Capability Service Entity
ASN Application Service Node
VM Virtual Machine Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing system comprising:
one or more computing processors; and
computing memory communicatively coupled to the one or more computing processors, the computing memory having stored therein executable instructions that, upon execution, cause the system to implement a first service orchestration management function and cause the first service orchestration management function to perform operations comprising:
detecting that orchestration of a service is to be performed;
processing a first orchestration profile to identify a service node, a service layer, or a service capability for orchestration;
determining using the first orchestration profile a desired service configuration for orchestration;
determining that the first orchestration profile identifies a second orchestration profile, the second orchestration profile associated with a second service orchestration management function;
transmitting a request to the second service orchestration management function to orchestrate a service using the second orchestration profile; and
receiving from the second service orchestration management function an indication that the requested orchestration using the second orchestration profile has been performed.

2. The computing system of claim 1, the computing memory having stored therein executable instructions that, upon execution, cause the system to perform further operations comprising: receiving the first orchestration profile.

3. The computing system of claim 2, wherein receiving the first orchestration profile comprises receiving a request for orchestration, the request for orchestration comprising the first orchestration profile.

4. The computing system of claim 1, wherein detecting that orchestration of a service is to be performed comprises receiving a request to perform orchestration.

5. The computing system of claim 1, wherein detecting that orchestration of a service is to be performed comprises the computing system detecting an event that triggers orchestration.

6. The computing system of claim 1, the computing memory having stored therein executable instructions that, upon execution, cause the system to perform further operations comprising:
in response to detecting orchestration of a service is to be performed, parsing the first orchestration profile to identify semantic information for use in further processing of the first orchestration profile.

7. The computing system of claim 6, wherein parsing the first orchestration profile to identify semantic information comprises identifying a computer link to a memory location comprising semantic information.

8. The computing system of claim 1, the computing memory having stored therein executable instructions that, upon execution, cause the system to perform further operations comprising:
in response to detecting orchestration of a service is to be performed, processing the first orchestration profile to identify in the first orchestration profile one or more of: scheduling information specifying when orchestration is to be performed; policy information specifying rules for determining orchestration is to be performed; and context information identifying information about a client that is to receive the service.

9. The computing system of claim 1, wherein determining using the first orchestration profile a desired service configuration comprises identifying an orchestration target is a network of service nodes, a service node, a service layer, or a service capability.

10. The computing system of claim 9, wherein identifying an orchestration target is a network of service nodes, a service node, a service layer, or a service capability comprises parsing a profile type.

11. The computing system of claim 1, the computing memory having stored therein executable instructions that, upon execution, cause the system to perform further operations comprising: determining using the first orchestration profile rules and context that qualify service orchestration.

12. A method performed by a first service orchestration management function executing on a computing system, the method comprising:
detecting that orchestration of a service is to be performed;
processing a first orchestration profile to identify a service node, a service layer, or a service capability for orchestration;
determining using the first orchestration profile a desired service configuration for orchestration;
determining that the first orchestration profile identifies a second orchestration profile, the second orchestration profile associated with a second service orchestration management function;
transmitting a request to the second service orchestration management function to orchestrate a service using the second orchestration profile; and receiving from the second service orchestration management function an indication that the requested orchestration using the second orchestration profile has been performed.

13. The method of claim 12, further comprising receiving the first orchestration profile,
wherein receiving the first orchestration profile comprises receiving a request for orchestration, the request for orchestration comprising the first orchestration profile.

14. The method of claim 12, wherein detecting that orchestration of a service is to be performed comprises receiving a request to perform orchestration.

15. The method of claim 12, wherein detecting that orchestration of a service is to be performed comprises the computing system detecting an event that triggers orchestration.

16. The method of claim 12, further comprising:
in response to detecting orchestration of a service is to be performed, parsing the first orchestration profile to identify semantic information for use in further processing of the first orchestration profile.

17. The method of claim 16, wherein parsing the first orchestration profile to identify semantic information comprises identifying a computer link to a memory location comprising semantic information.

18. A computer readable storage medium comprising computer executable instructions which, when executed by a processor, cause a first service orchestration management function executing on a computing system to perform operations comprising:
detecting that orchestration of a service is to be performed;
processing a first orchestration profile to identify a service node, a service layer, or a service capability for orchestration;
determining using the first orchestration profile a desired service configuration for orchestration;
determining that the first orchestration profile identifies a second orchestration profile, the second orchestration profile associated with a second service orchestration management function;
transmitting a request to the second service orchestration management function to orchestrate a service using the second orchestration profile; and
receiving from the second service orchestration management function an indication that the requested orchestration using the second orchestration profile has been performed.

19. The computer readable storage medium of claim 18, wherein the instructions, when executed, further cause the computing system to perform operations comprising receiving the first orchestration profile,
wherein receiving the first orchestration profile comprises receiving a request for orchestration, the request for orchestration comprising the first orchestration profile.

20. The computer readable storage medium of claim 18, wherein detecting that orchestration of a service is to be performed comprises receiving a request to perform orchestration.

21. The computer readable storage medium of claim 18, wherein detecting that orchestration of a service is to be performed comprises the computing system detecting an event that triggers orchestration.

22. The computer readable storage medium of claim 18, wherein the instructions, when executed, further cause the computing system to perform operations comprising:
in response to detecting orchestration of a service is to be performed, parsing the first orchestration profile to identify semantic information for use in further processing of the first orchestration profile.

23. The computer readable storage medium of claim 22, wherein parsing the first orchestration profile to identify semantic information comprises identifying a computer link to a memory location comprising semantic information.

* * * * *